United States Patent
Dotan-Cohen et al.

(10) Patent No.: US 11,194,796 B2
(45) Date of Patent: Dec. 7, 2021

(54) INTUITIVE VOICE SEARCH

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Haim Somech, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 78 days.

(21) Appl. No.: 16/276,512

(22) Filed: Feb. 14, 2019

(65) Prior Publication Data

US 2020/0265048 A1    Aug. 20, 2020

(51) Int. Cl.
*G06F 16/2452* (2019.01)
*G06F 16/2457* (2019.01)
*G10L 15/22* (2006.01)

(52) U.S. Cl.
CPC .. *G06F 16/24522* (2019.01); *G06F 16/24578* (2019.01); *G10L 15/22* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 8,892,446 B2* | 11/2014 | Cheyer | ............... | B60K 35/00 704/275 |
| 8,903,716 B2* | 12/2014 | Chen | ............... | G06F 16/3329 704/9 |
| 8,930,191 B2* | 1/2015 | Gruber | ............... | G10L 13/08 704/257 |

(Continued)

FOREIGN PATENT DOCUMENTS

| WO | 2017023807 A1 | 2/2017 |
|---|---|---|
| WO | 2017074661 A1 | 5/2017 |

OTHER PUBLICATIONS

"International Search Report and Written Opinion issued in PCT Application No. PCT/US20/016685", dated Jun. 15, 2020, 9 Pages.

*Primary Examiner* — Marcus T Riley
(74) *Attorney, Agent, or Firm* — Shook, Hardy and Bacon L.L.P.

(57) ABSTRACT

Technologies described herein improve voice-based interaction technology and provide improved user experiences for computer-performed searching within voice-based applications. After receiving a voice command that involves performing a search operation in order to respond to the command, a more intuitive response may be generated and presented to the user. In particular, certain features or properties related to the search results are determined and utilized as discriminators. A discriminator may be provided in the response to the user to enable the user to distinguish between multiple search results, or to more readily confirm a particular result, provided by the computing system. In (Continued)

some instances, certain details of the search results may be omitted when generating the response. In this way, the computing system may present the user with a limited but more focused set of information that is more useful for making a decision and/or continuing the interaction with the computing system.

20 Claims, 8 Drawing Sheets

(56) References Cited

U.S. PATENT DOCUMENTS

| | | | | |
|---|---|---|---|---|
| 8,942,986 | B2* | 1/2015 | Cheyer | G06F 3/167 |
| | | | | 704/275 |
| 9,117,447 | B2* | 8/2015 | Gruber | B60K 35/00 |
| 9,305,553 | B2* | 4/2016 | Meisel | G10L 15/32 |
| 9,318,108 | B2* | 4/2016 | Gruber | G06F 16/3329 |
| 9,548,050 | B2* | 1/2017 | Gruber | G06F 16/3344 |
| 10,102,844 | B1 | 10/2018 | Mois et al. | |
| 10,176,810 | B2* | 1/2019 | Kumar | G10L 15/30 |
| 10,276,170 | B2* | 4/2019 | Gruber | G06F 16/9537 |
| 10,474,753 | B2* | 11/2019 | Bellegarda | G10L 25/30 |
| 10,496,705 | B1* | 12/2019 | Irani | G06F 9/451 |
| 10,691,473 | B2* | 6/2020 | Karashchuk | G06F 3/0482 |
| 10,706,841 | B2* | 7/2020 | Gruber | G10L 15/22 |
| 10,741,185 | B2* | 8/2020 | Gruber | G06Q 10/02 |
| 10,839,159 | B2* | 11/2020 | Yang | G06N 5/022 |
| 10,853,103 | B2* | 12/2020 | Zhu | G06K 9/00664 |
| 10,854,206 | B1* | 12/2020 | Liu | G06F 3/0237 |
| 2010/0098225 | A1 | 4/2010 | Ashton et al. | |
| 2013/0174034 | A1 | 7/2013 | Brown et al. | |
| 2016/0188565 | A1* | 6/2016 | Robichaud | G06F 16/3334 |
| | | | | 704/9 |
| 2018/0032503 | A1 | 2/2018 | Swart et al. | |
| 2018/0061402 | A1* | 3/2018 | Devaraj | H04L 67/306 |
| 2018/0114531 | A1* | 4/2018 | Kumar | G10L 25/51 |
| 2018/0349473 | A1 | 12/2018 | Smith et al. | |
| 2018/0358014 | A1* | 12/2018 | Bang | G06F 16/29 |
| 2019/0373102 | A1* | 12/2019 | Weinstein | G06F 16/90332 |
| 2020/0265048 | A1* | 8/2020 | Dotan-Cohen | G06F 16/3329 |

\* cited by examiner

INTUITIVE VOICE SEARCH

BACKGROUND

Voice-based interactions with computer systems are becoming increasingly common. For instance, many interactions between a user and a computing device now occur without using a graphical user interface (GUI), and often the device itself does not even have a GUI, such as the case of a smart speaker or many types of computing devices in vehicles, or many types of wearable devices. During a voice-based interaction between a user and a computing device, responding to a user request, such as a request to call a particular person or play a particular song, often involves the computing device performing a search operation, such as searching the user's contacts to place the call or searching a music library to play the song.

Interactions by voice, and in particular searching interactions by voice, however, introduce new challenges which are different from the ones of the traditional search, mainly due to the extra burden in requesting the user to hear many options and to effectively select the desired one. For example, rather than responding more intuitively to a user request, the conventional computing systems may respond by reading off the search engine results, requiring the user to listen to extraneous details and often many different options in order to make a selection (e.g., which of their contacts to call) or to confirm the response read by the computing system.

It would be helpful for a computing system operating with voice-based interactions to be configured to operate in a more intuitive way by generating responses to user requests that include certain features or properties of the search results that enable a user to readily distinguish between multiple choices or to readily confirm a particular response read by the computing system.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technologies described in this disclosure are directed towards systems and methods for providing improved voice-based user-computer interaction technology and improving the user experience for computer-performed searching within voice-based applications and computing devices, such as a smart speaker. Some embodiments comprise an improved voice-based functionality for a virtual assistant program. At a high level, after receiving a user request (which may comprise a voice command) that involves performing a search operation in order to respond to the request, embodiments described herein may utilize a number of factors, such as features or properties of the search results, current or historic user activity information, contextual information, and other aspects described herein, to generate a response to the user request. The response is generated to be more intuitive to the user's intent of the request than merely reading back search results to the user.

In particular, instead of merely presenting the conventional search engine results in an audible format, embodiments described herein determine certain features or properties related to the search engine results, that may be utilized as discriminators. These discriminators enable a user to distinguish between multiple search results, or to more readily confirm a particular result, provided by the computing system. One or more discriminators may be presented to the user in the response to the user request provided by the computing system. Moreover, in some embodiments, certain details of the search results, such as other features or properties that are not determined to be discriminators, may be omitted by the computing system when generating and presenting a response to the user request. In this way, the computing system may present the user with a limited but more focused set of information that is more useful for making a decision and/or continuing the interaction with the computing system, and without having the burden of listening to many options and/or extraneous details or risking the user becoming confused about which option to select or even forgetting what was the original request.

Further still, some embodiments include functionality for using the discriminators to further personalize the response generated and provided to a user. In particular and as further described herein, these embodiments modify or supplement information about a search result to be presented to the user in the response thereby enabling the user to better understand the response and make a more informed decision and/or continue the interaction.

In these ways, embodiments of the disclosure provide improved voice-based user-computer interaction and an improved user experience for computer-performed searching within voice-based applications and computing devices.

BRIEF DESCRIPTION OF THE DRAWINGS

Aspects of the technology described in the present application are described in detail below with reference to the attached drawing figures, wherein.

DETAILED DESCRIPTION

Figure 1:
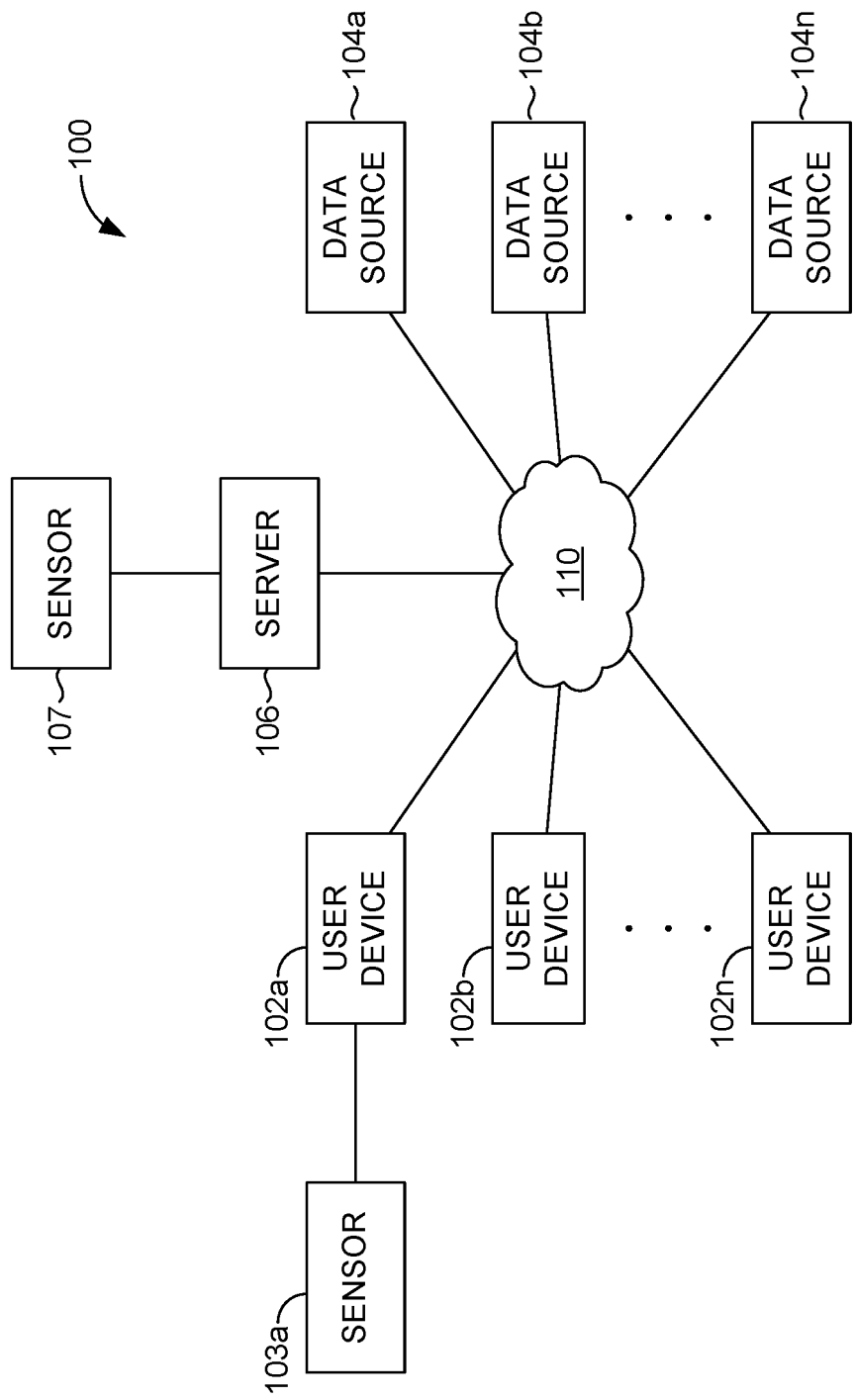
FIG. 1 is a block diagram of an example operating environment suitable for implementing aspects of the disclosure.

The subject matter of aspects of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are directed towards systems, methods, and computer storage media for, among other things, improved voice-based user-computer interaction technology and improving the user experience for computer-performed searching within voice-based applications and computing devices, such as a smart speaker or virtual assistant application running on a mobile computing device. Some embodiments comprise improved voice-based functionality for a virtual assistant or personal digital assistant, which comprises one or more computer programs, and which may operate on or across one or more computing devices. For example, one such virtual assistant is the Cortana® assistant by Microsoft® Corporation.

As described previously, voice-based interactions with computer systems are becoming increasingly common. For example, many people now own smart-speaker devices in their homes, and voice-based interaction is becoming more common in smart appliances, vehicles, and as a means for people to interact with their mobile devices. During a voice-based interaction, responding to a user's request (which may comprise a voice command or question to the computing system) often involves performing a search operation. For example, searching the user's contacts to make a call, searching nearby restaurants for lunch, searching music or media to play back to the user, or responding to other user questions or requests. Conventional virtual-assistant technology may respond to the user's request by reading all, or a portion of, search engine results determined in response to the user's request. But it is not desirable, nor necessarily helpful, for the user's decision making or for facilitating user interaction, for the virtual assistant to merely read off the results from the search. For example, if a user requests is to "call Walgreens," a conventional virtual assistant on a smart speaker may respond with "I do not see a Walgreens in your contacts. Here are some other options: 1) Contact Us|Walgreens, Contact Us Walgreens Landing Page . . . . For specific questions about your in-store pharmacy or photo order, please contact your Walgreens store directly. 2) Customer Service Representative|Website Service . . . —Walgreens, Contact Us Walgreens Forms Page . . . . It may be necessary in some cases for Customer Service to contact the customer in order to complete a request. 3) Customer Service Help|Walgreens . . . ."

Figure 4A:
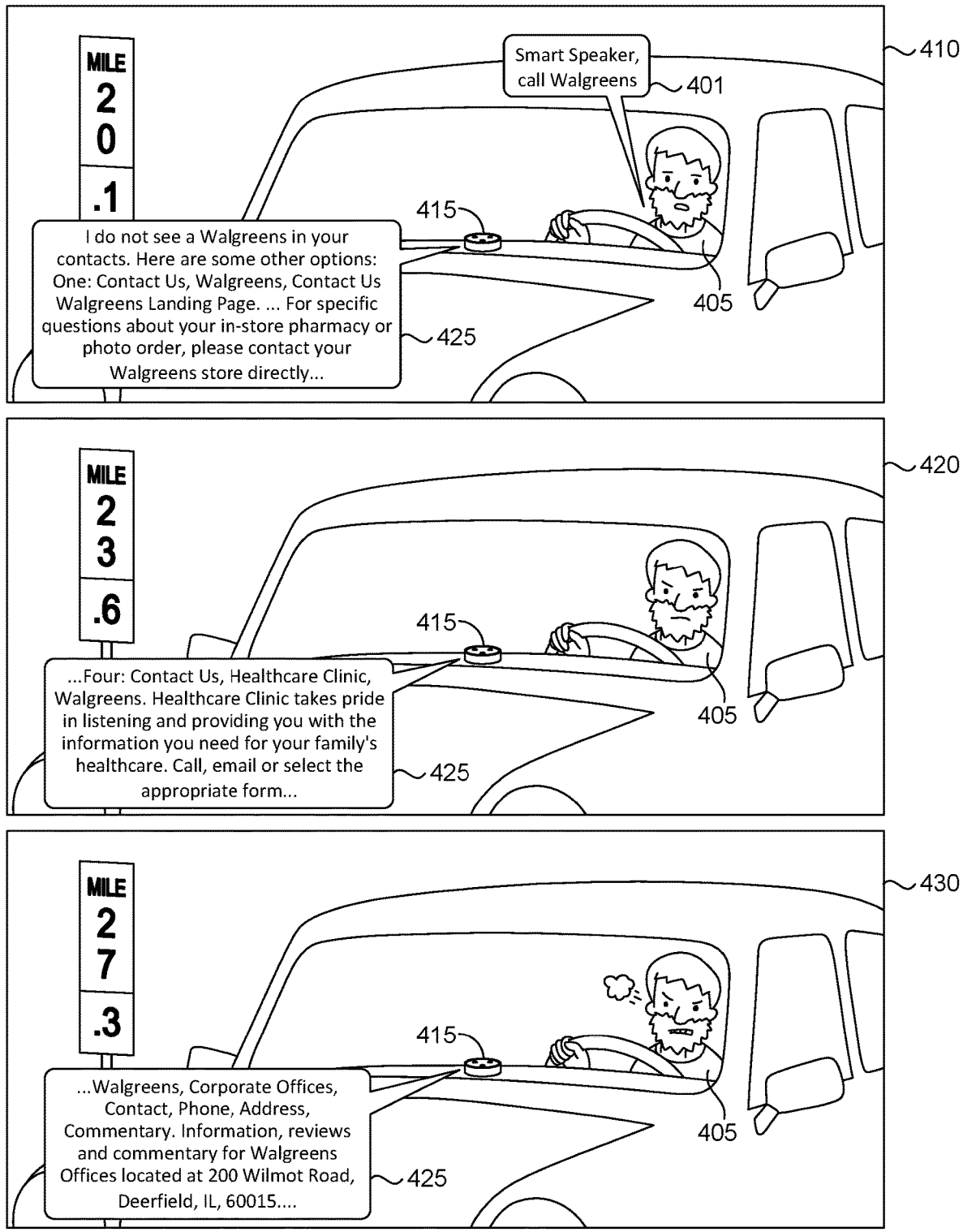
FIG. 4A depicts an example of a conventional voice-based interaction between a user and smart speaker.

One example of a conventional interaction between a user and smart speaker is illustratively depicted in FIG. 4A, which shows a user 405 driving a car and interacting with a smart speaker 415. In response to the user's request 401 to call Walgreens pharmacy (scene 410), the smart speaker 415 responds 425, starting in scene 410 and continuing through scene 420 and through scene 430. As shown in scene 420, the user 405 is losing patience (or perhaps distracted and forgetting what he asked). By scene 430, the user 405 is getting angry. In contrast to this frustrating experience, embodiments of the technologies described herein generate and provide a more intuitive response to the user's request that include certain features or properties of the search results that enable a user to more readily distinguish between multiple choices or to more readily confirm a particular response read by the computing system.

Accordingly, at a high level, in response to a request by a user, a search operation may be performed by the virtual assistant or a computer program operating on a computing system (sometimes referred to herein as a computing device or a user device). The search operation may be performed in response to an explicit request by the user (e.g., the user asks the virtual assistant or the computing system to "Look up movie times for Wonder Woman") or a search may be performed as part of, or in response to, another user request or command (e.g., the user tells the computing device to "call Ido," which then may prompt the computing device to perform a search of the user's contacts). After receiving by the computing system, a voice-based user request that involves performing a search operation in order to respond to the request, embodiments described herein may utilize a number of factors, such as features or properties of the search results, current or historic user activity information, contextual information (e.g., time, date, current user location, applications currently running on user device(s), or other contextual information), and other aspects described herein, to generate a response to the user request. The response is generated to be more intuitive to the user's intent of the request than merely reading back search results to the user. Additionally, the computing device may carry out the user's request such as by performing an action associated with the request. Or in some instances, based on subsequent user interactions (such as the user subsequently responding to a response provided by the computing system that was generated following an initial user request), the computing system may carry out an action associated with the user request, such as calling Ido or determining and providing movie times for Wonder Woman.

In particular, instead of merely presenting the search engine results in an audible format, some embodiments described herein may be considered to utilize a user's intent associated with the user request in order to determine certain features or properties related to the search engine results that may be utilized as discriminators. These discriminators enable a user to distinguish between multiple search results, or to more readily confirm a particular result, provided by the computing system. One or more discriminators may be provided to the user in the response of the computer system to the user request. For example, if a user searches for a restaurant, then the discriminators might include the restaurant location or the cuisine. Thus, instead of merely reading back all of the results from a user query such as "what restaurants are nearby," a voice-based personal assistant application may instead say "there is an Italian restaurant on Main Street and a French restaurant on Broadway."

Moreover, in some embodiments, certain details of the search results, such as other features or properties that are not determined to be discriminators, may be omitted by the computing system when generating and presenting a response to the user request. For instance in the above example response to a user request to "call Walgreens," according to the conventional technology, a conventional smart speaker (or a virtual assistant operating thereon) might respond as shown in FIG. 4A with "One Contact Us, Walgreens, Contact Us Walgreens Landing Page. For specific questions about . . . " In contrast, an embodiment of this disclosure may instead respond to the user request to call Walgreens with, for instance, "Did you want to call the Walgreens in Bellevue or the Walgreens in Redmond?" In this way, the computing system or virtual assistant may present the user with a limited but more focused set of information that is more useful for making a decision and/or continuing the interaction with the computing system, and without having the burden of listening to many options and/or extraneous details or risking the user becoming confused or frustrated about which option to select or even forgetting what was the original request.

Figure 4B:
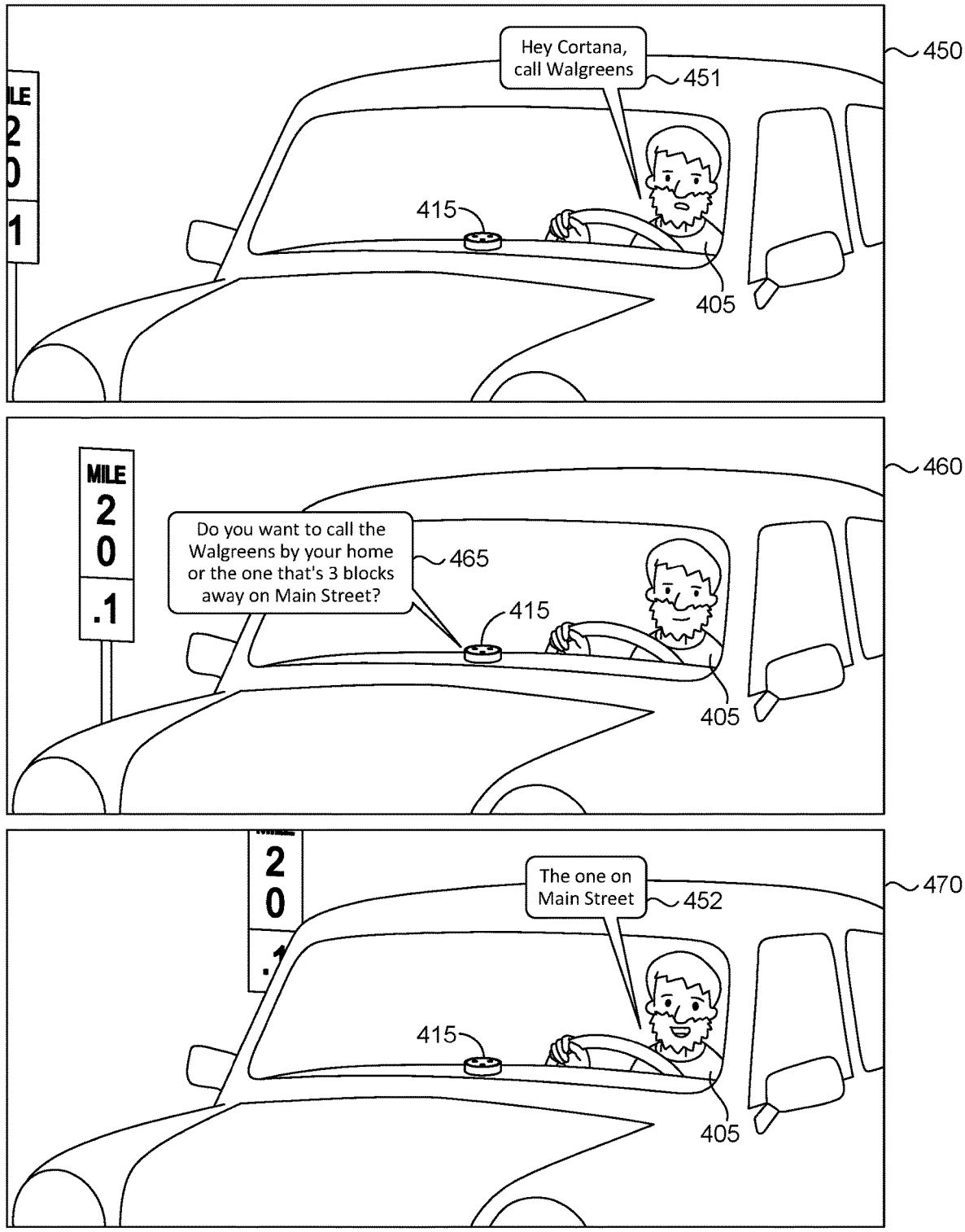
FIG. 4B depicts an example voice-based interaction between a user and a computing system, in accordance with an embodiment of this disclosure.

Further still, some embodiments include functionality for using the discriminators to further personalize the response generated and provided to a user. In particular, these embodiments can modify or supplement information about a search result to be presented to the user in the response. For instance, if the discriminator is location, rather than generating and providing a response that states the address location of an entity in the search result, such as the address of a venue, the location information may be modified to be personalized to the user. For example, in response to a user request to call Walgreens, instead of "Did you want to call the Walgreens pharmacy on 123 Main Street or 456 Second Street," the response may be modified to be further personalized, such as "Did you want to call the Walgreens by your work or the one by your house?" Similarly, the response may be modified to be further personalized as "Did you want to call the Walgreens by your work or the Walgreens you called last week?" Or as shown in the example of FIG. 4B, "Do you want to call the Walgreens by your home or the one that's three blocks away on Main Street?"

Accordingly, in one respect, some embodiments of this disclosure may be considered to reside or operate between a search engine component, which may be conventional search engine like Bing® or a local or domain-specific search engine, such as a file search engine or user-contacts search engine, and a user-interface component for audibly presenting search results to the user. For some of these embodiments, the search results, received from a search performed in response to a user request, may be reformatted for audio presentation based on determined discriminator(s), such as by selectively extracting and using only certain information in the search results, by altering or modifying information in the search results, and/or by supplementing search results information with additional information relevant to the user decision making. For instance, in the above example with Walgreens, the location information may be considered a discriminator. Accordingly, the location of the two Walgreens may be determined, extracted from the search results, and then presented to the user. Thus, rather than hearing a long, unhelpful response of information about contacting Walgreens, such as what is provided by a conventional search engine operation, the user hears a shorter answer to her request with the relevant information that enables the user to choose one Walgreens over another.

Although a primary focus of this disclosure is voice-based interactions, it is also contemplated that some embodiments may be utilized for presenting a response via a GUI (i.e., a visual-presentation of a response including one or more search results). For example, rather than generating and visually presenting search results, such as provided by a conventional search engine operating in a web browser, in some embodiments of this disclosure, a response to a user request may be generated and visually presented that includes one or more discriminators and does not include extraneous details, as described herein. Such embodiments may be utilized for certain applications of improving user accessibility, such as for users with limited vision or hearing impairment, or for younger users, that prefer to receive simpler and clearer responses from interactions with a computer system. Similarly, these embodiments may be useful in environments where users have limited or diverted attention, such as while driving a car, operating equipment, or performing a focus-intensive task. In this way, such embodiments disclosed herein provide an improved computer-user-interface technology.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart speaker, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
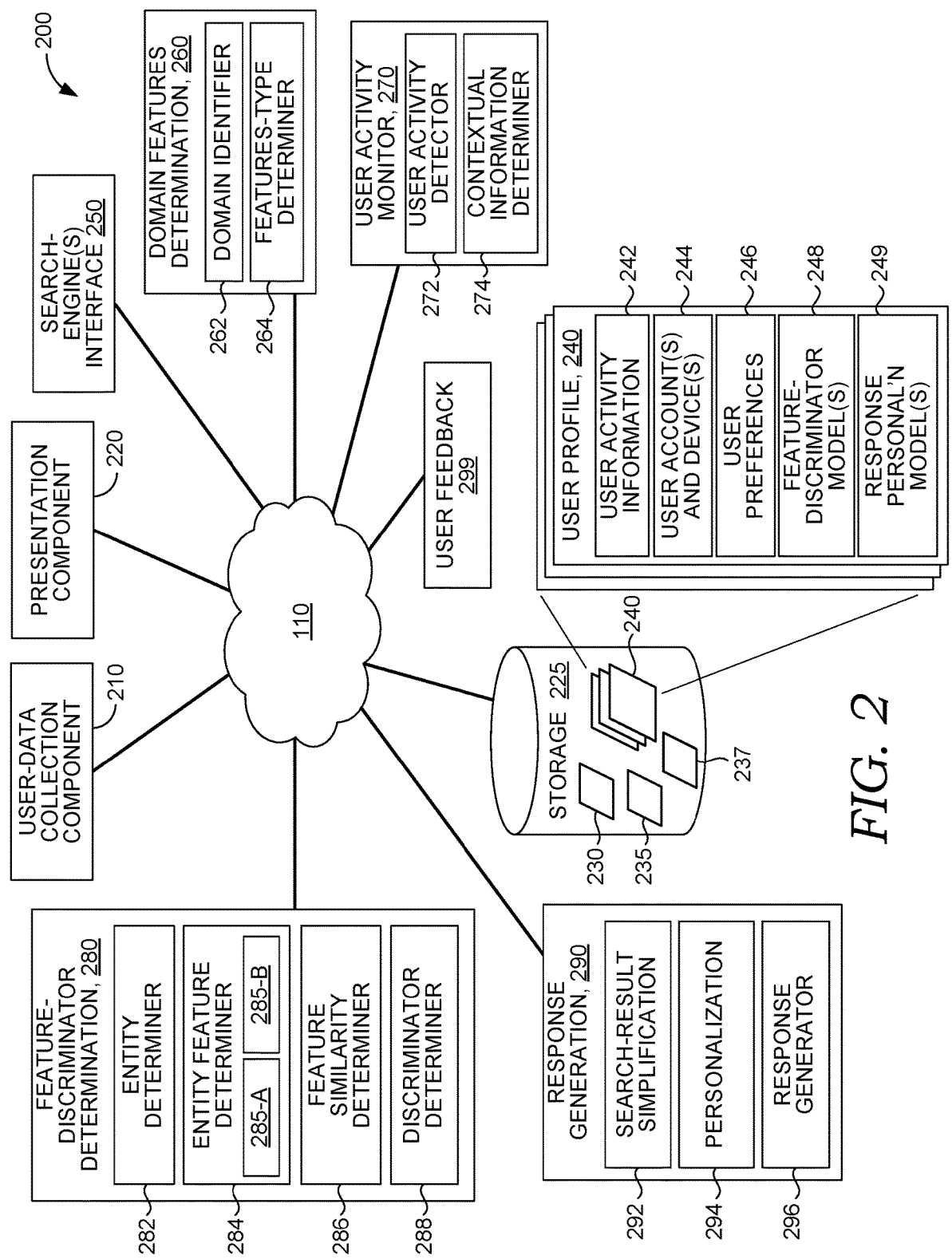
FIG. 2 is a diagram depicting an example computing architecture suitable for implementing aspects of the disclosure.

Operating environment 100 can be utilized to implement one or more of the components of system 200, described in FIG. 2, including components for collecting user data, monitoring user activity and events, performing a search or communicating information to/from a search engine, determining a discriminator, updating logic or models based on user feedback, and for generating a response. Operating environment 100 also can be utilized for implementing aspects of process flows 500 and 600, described in FIGS. 5 and 6. Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, storage 225, search-engine(s) interface 250, domain features determination component 260, user activity monitor 270, feature-discriminator determination 280, response generation 290, and user feedback 299. User-data collection component 210, presentation component 220, search-engine(s) interface 250, domain features determination component 260, user activity monitor 270, feature-discriminator determination 280, response generation 290 and user feedback 299, may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of system 200 are associated with one or more personal digital assistant (sometimes referred to as "virtual assistant") applications, services, or routines. In particular, such applications, services, or routines may operate on one or more user devices (such as user device 104a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, or other abstraction layer(s), of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

A high level example is provided according to an embodiment implemented using the example architecture of system 200. Additional details of this and other embodiments are described below. In responding to a user request that involves performing a search operation, search query related information including search results and domain information may be received via search-engine(s) interface 250. This domain information may be utilized by domain features determination component 260 to determine a set of feature-types for a domain.

Next, feature-discriminator determination 280 may receive the search results and the feature-types information. Feature-discriminator determination 280 then may identify an entity in a search result (i.e., the item or element of a search result, which may have a set of properties or features included in the search result that characterize this item or element), and use the feature-types to determine specific features (including values for the feature types) associated with the entity. For example, if a search domain is restaurants, some of the feature-types might include business hours and cuisine; if a particular search-result entity is a particular restaurant, then the features might include the specific hours that the restaurant is open and the specific cuisine served at the restaurant. In some instances, user activity or user history and contextual information, which may be determined by user activity monitor 270, may be used by feature-discriminator determination 280 to determine features that are personal to the user (i.e., personal features), such as user history associated with an entity (e.g., for an entity that is a venue, a personal feature might include a previous visit to the venue by the user). Feature-discriminator determination 280 then utilizes the entity features to determine one or more features that may be used as discriminators for an entity. In some instances, feature-discriminator determination 280 may perform a comparison of entity features to facilitate determining a discriminator. In some embodiments, a machine-learning model may be utilized to classify or score a feature (or feature type) as a discriminator, as further described herein.

Next, response generation 290 may receive the search results, or one or more entities from the results, and the corresponding discriminator(s) determined by feature-discriminator determination 280. Response generation 290 may simplify a result, such as pruning extraneous information, and may further supplement the result such as by including additional information associated with a discriminator or modifying a discriminator to be personal to a user (e.g., replacing a physical address with location information that is relative to the user, such as presenting location in relation to where the user lives or works). Response generation 290 then generates the response, which then may be presented to the user via presentation component 220. For instance, the response may be spoken by the computer-generated voice of the virtual assistant. In some embodiments, response generation 290 utilizes a machine-learning model to personalize a response for a user, as further described herein.

Accordingly, continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user activity monitor 270, search-engine(s) interface 250, feature-discriminator determination 280, or other components or subcomponents of system 200. The data may be received (or accessed), and optionally accumulated, reformatted, and/or combined, by user-data collection component 210 and stored in one or more data stores such as storage 225, where it may be available to the components or subcomponents of system 200. For example, the user data may be stored in or associated with a user profile 240, as described herein. In some embodiments, any personally identifying data (i.e., user data that specifically identifies particular users) is either not uploaded from the one or more data sources with the user data, is not permanently stored, is de-identified from any particular user, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information, such as user data, from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; acoustic data such as user utterances, voice data such as automatic speech recognition or a transcription of user speech; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Search-engine(s) interface 250 is generally responsible for communicating query information (which may include search results and related metadata) with a search engine or a searching operation. As described previously, responding to a user's request, and in particular responding during a voice-based interaction, often involves performing one or more search operations. A search operation may be performed using a search engine, which is a specialized computer program or set of routines for performing a search. Embodiments of search-engine(s) interface 250 thus facilitate communicating with one or more search engines that perform the search operation. For example, search-engine(s) interface 250 can receive search results information and related metadata from a search engine or search operation, and in some embodiments may also provide query information to a search engine for a performing a search operation. (For example, as described herein, in some embodiments, user feedback from a presented response to a user request may be utilized to re-run a search operation and generate a subsequent response. In these embodiments, search-engine(s) interface 250 may facilitate generating or providing a query to a search engine.)

In some embodiments, search-engine(s) interface 250 comprises an application programming interface (API) to a search engine (or a plurality of search engines) that can perform local, cloud-based, Internet/world-wide-web, network-level, or domain-specific searches. For example, one such search engine is the Bing® search engine by Microsoft Corporation. Without limitation, other examples include search engines optimized for searching information about a user's contacts, files (e.g., local computer documents or files on a network- or cloud-storage), media such as images, music, movies, location, and flights or travel. As described above, some embodiments may be considered to operate between a search engine component, which may be a conventional search engine like Bing® or a local or domain-specific search engine, such as a file search engine or user-contacts search engine, and a user-interface component for presenting to a user the more intuitive response generated by an embodiment described herein.

In some embodiments, the search results information received by search-engine(s) interface 250 includes one or more search engine results (search results) and related search-domain information. In some embodiments, the search query also may be provided. In particular, many existing search engines include domain-classifier functionality for determining a domain (or a set of domains) associated with a search query. A domain may be considered a category or subject topic for a search and may be used by a search-engine to focus the search. In many instances, a domain is representative of a user's intent regarding the search query (or the request that prompted the search). By way of example and without limitation, a domain may comprise: the user's contacts, user files/documents/emails, events, calendar items, media/entertainment such as images, videos, music, or computer games, websites, physical venues, businesses, addresses, subject-matter topics (e.g., cars, law, American history, a particular company), or shopping/products, purchases, or flights/travel. For example, a user request to call John may involve a search (performed by the computer system or virtual assistant) of the user's contacts for a name John and the corresponding phone number. A domain of this search is the user's contacts. As another example, if a user request comprised "fly away," a search engine might consider multiple domains and rank them (or rank the search results) based on a most likely domain. For instance, here, the search domain for "fly away" may be media corresponding to the song titled, Fly Away, or flights.

In some embodiments, the search results and information about the corresponding domain(s) may be received via search-engine(s) interface 250. In some instances, information about the corresponding domains may comprise a ranked list of likely domains corresponding to the search result. Alternatively, in other embodiments, search-engine(s) interface 250 may determine the domain information based on the search query and/or search results.

Domain features determination component 260 is generally responsible for determining entity-feature types based on domains associated with a search query. Embodiments of domain features determination component 260 may receive search results and/or domain information from search-engine(s) interface 250, and use this to determine a set of feature types corresponding to a particular domain. For example, a particular search result for a search query in the music domain might comprise an entity (e.g., a particular song, a particular artist, or a particular album) and properties (features) that characterize the entity. The feature types are the typical categories of the properties (or features) of entities in the domain. For example, for the music domain, feature types might include artist, album, song title, song duration, album cover art, release year, music genre, or similar properties that can describe a music entity.

As shown in example system 200, domain features determination component 260 comprises a domain identifier 262 and a features-type determiner 264. Domain identifier component 262 is generally responsible for determining one or more domains associated with search results, which may be received from search-engine(s) interface 250. As described previously, in some embodiments, domain information may be received from or determined by search-engine(s) interface 250. Accordingly, domain identifier 262 determines or identifies the domain corresponding to a search result, and in some embodiments, may determine the domain corresponding to each search result.

Features-type determiner 264 is generally responsible for determining a set of feature categories that correspond to the domain(s) identified by domain identifier 262. The feature categories or feature types may be considered as types of parameters or types of properties that describe an entity of a search result. For example, for the music domain, feature types might include artist, genre, and year released. Thus for a particular search-result entity in this domain, such as the song Fly Away, the specific features corresponding to these three feature types would be: Lenny Kravitz (artist), alternative rock (genre), 1998 (year released).

In some embodiments, feature types (and their corresponding features) may be considered to be global feature types or feature types inherent to an entity in the domain, and feature-types (or features) that are personal to the user. Global feature types might include, for example and without limitation: color, size, brand, make/model, or physical properties of an entity that is an item (such as an item the user might purchase or has previously purchased); customer review-rating of a venue or an item purchased or that may be purchased (e.g., a star-rating from customer/purchaser reviews), YPID location or address for a physical venue, cuisine or venue type (e.g., coffee house, Italian restaurant, steakhouse, bar); media features such as genre, artist, year released, song title, social-media-/search-popularity rating, or other feature types that characterize an entity without regard to a specific user.

Two particular feature types that are relevant to many of the embodiments used for voice-based implementations described herein include entity spelling and entity pronunciation. In particular, in certain situations, these two feature types may be utilized to determine a discriminator. For example, where it is determined that two search-result entities are homophones and thus have a similar pronunciation feature but a different spelling feature, the spelling feature may be considered for use as a discriminator.

As described below in connection to feature-discriminator determination 280, personal features may comprise user activity and user history associated with an entity. For instance, if the entity is a venue, personal features might include previous visit(s) to the venue, the date and the time of the previous visit(s), user patterns or behavior associated with the entity (e.g., a user has a pattern of visiting the venue every Saturday), or other user activity associated with the venue. In some embodiments, features-type determiner 264 determines a set of global feature-types, which may be used by feature-discriminator determination 280 or more specifically entity feature determiner 284 to determine specific features. Personal features also may be determined by feature-discriminator determination 280 or entity feature determiner 284.

It should be noted that in some instances, a particular research result may not have data for a particular feature type. Thus in some embodiments, feature types determined by features-type determiner 264 comprise a set of feature types that are typically associated with a domain, and not necessarily present in one or all of the particular search results. Additionally, some feature types are specific to one domain or specific to limited set of domains (e.g., genre or album for the music domain), while other feature types may be present for many (or all) domains (e.g., entity spelling, entity pronunciation). Accordingly, in some embodiments of features-type determiner 264, each domain has a set of corresponding feature categories, and a set of rules or table-look-up may be employed. In some embodiments, feature-categories logic may be used to determine a set of feature types. For example, new feature-types or feature-types for new domains may be learned by analyzing the search results, such as by classifying the types of descriptive metadata returned with the search results for a particular domain. In an embodiment, statistical clustering may be employed to classify the search-result metadata in order to derive new or updated sets of feature types for a domain.

User activity monitor 270 is generally responsible for monitoring user data to determine user activity information, which may include identifying and/or tracking specific user actions, activity on user device(s) or associated with a particular user, and related contextual information. User activity information may be determined by monitoring user data received from user-data collection component 210. As described previously, in some embodiments, user activity information, such as user history and/or related contextual information, may be used (by feature-discriminator determination 280, described below) to determine entity-related features that are personal to the user (i.e., personal features). For example, for an entity that is a restaurant, a personal feature might include a previous visit to the restaurant by the user. The user activity information determined by user activity monitor 270 may include user activity information from multiple user devices associated with the user and/or from cloud-based services associated with the user (such as email, calendars, social media, or similar information sources), and which may include contextual information associated with the identified user activity. User activity monitor 270 may determine current or near-real-time user activity information and may also determine historical user activity information, in some embodiments, which may be determined based on gathering observations of user activity over time, accessing user logs of past activity (such as browsing history or prior communications, which may include communications across different messaging platforms, for example). Further, in some embodiments, user activity monitor 270 may determine user activity (which may include historical activity) from other similar users (i.e., crowdsourcing).

In an embodiment, user activity monitor 270 comprises one or more applications or services that analyze information detected via one or more user devices used by the user and/or cloud-based services associated with the user, to determine activity information and related contextual information. More specifically, in some implementations of user activity monitor 270, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user activity monitor 270, or its subcomponents, may determine a device name or identification (device ID) for each device associated with a user. This information about the identified user devices associated with a user may be stored in a user profile associated with the user, such as in user accounts and devices 244 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user activity monitor 270. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As shown in example system 200, user activity monitor 270 comprises user activity detector 272 and contextual information determiner 274. In some embodiments, user activity monitor 270, one or more of its subcomponents, or other components of system 200, may determine interpretive data from received user data, as described herein. Additionally, although several examples of how user activity monitor 270 and its subcomponents may identify user activity information are described herein, many variations of user activity identification and user activity monitoring are possible in various embodiments of the disclosure.

User activity detector 272, in general, is responsible for determining (or identifying) a user action or activity event has occurred. Embodiments of user activity detector 272 may be used for determining current user activity or one or more historical user actions. Some embodiments of user activity detector 272 may monitor user data for activity-related features or variables corresponding to user activity such as indications of applications launched or accessed, files accessed, modified, copied, etc., websites navigated to, online content downloaded and rendered or played, or similar user activities.

Additionally, some embodiments of user activity detector 272 extract from the user data information about user activity, which may include current user activity, historical user activity, and/or related information such as contextual information. (Alternatively or in addition, in some embodiments, contextual information determiner 274 determines and extracts contextual information.) By way of example and without limitation, extracted user activity information may include app usage, online activity, searches, calls/messages, usage duration, application data (e.g., emails, messages, posts, user status, notifications, application content), location information or venue visits, purchases, physiological information (e.g., workout data), which may be provided by a wearable device, or nearly any other data related to user interactions with the user device or user activity via a user device.

Among other components of system 200, the extracted user activity information determined by user activity detector 272 may be provided to contextual information determiner 274 or other components of system 200. Further, the extracted user activity information may be stored in a user profile associated with the user, such as in user activity information component 242 of user profile 240. (In some embodiments, user activity detector 272 or user activity monitor 270 performs conflation on the detected user activity information. For example, overlapping information may be merged and duplicated or redundant information eliminated.) In some embodiments, user activity detector 272 runs on or in association with each user device for a user. User activity detector 272 may include functionality that polls or analyzes aspects of the operating system to determine user activity related features (such as installed or running applications or file accesses and modifications, for example), network communications, and/or other user actions detectable via the user device including sequences of actions.

Contextual information determiner 274, in general, is responsible for determining contextual information related to the user activity (detected by user activity detector 272 or user activity monitor 270), such as context features or variables associated with user activity, related information, and user-related activity, and is further responsible for associating the determined contextual information with the detected user activity. In some embodiments, contextual information determiner 274 may associate the determined contextual information with the related user activity and may also log the contextual information with the associated user activity. Alternatively, the association or logging may be carried out by another service.

Some embodiments of contextual information determiner 274 determine contextual information related to user activity such as entities identified in a user activity or related to the activity (e.g., the other party of a call conducted by the user) and information about those entities, date-time of the activity, a location or venue of the user device when user activity is detected, or other particular events occurring before, during, or after a particular activity. By way of example and not limitation, this may include context features such as location data; which may be represented as a location stamp associated with the activity; contextual information about the location, such as venue information (e.g., the user's office location, home location, school, restaurant, movie theater); yellow pages identifier (YPID) information; time, day, and/or date, which may be represented as a time stamp associated with the activity; user device characteristics or user device identification information regarding the device on which the user carried out the activity; duration of the user activity; other user activity/activities preceding and/or following the user activity (which may include sequences of user activities), other information about the activity such as entities associated with the activity (e.g., venues, people, objects), information detected by sensor(s) on user devices associated with the user that is concurrent or substantially concurrent to the user activity (e.g., motion information or physiological information detected on a fitness tracking user device, listening to music, which may be detected via a microphone sensor if the source of the music is not a user device), or any other information related to the user activity that is detectable that may be used for determining patterns of user activity.

Contextual information also may include information about projects the user is working on, meetings or calendar events, and other people who have a relation to the user, such as the user's contacts, coworkers, project teams, or groups. For instance, in one example, contextual information indicating a particular contact is likely a co-worker may be determined by analyzing emails or meeting invites where the contact is a recipient/sender, which may include analyzing the topic of the message or meeting, attachment content, domain of the email address (which may indicate the user and contact are coworkers if the domain is the same and it corresponds to a company name, such as @microsoft.com).

In embodiments using contextual information related to user devices, a user device may be identified by detecting and analyzing characteristics of the user device, such as device hardware, software such as OS, network-related characteristics, user accounts accessed via the device, and similar characteristics. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. In some embodiments, contextual information may be determined from the user data of one or more users, in some embodiments, which may be provided by user-data collection component 210 in lieu of or in addition to user activity information for the particular user.

In some implementations, contextual information determiner 274 may receive user data from user-data collection component 210, parse the data, in some instances, and identify and extract context information. The determined contextual information may be associated with determined user activity, and may be stored in a user profile, such as in user activity information component 242. In some embodiments, information about user activity events may be weighted according to the frequency, amount of time, and/or recency (i.e., the "freshness" of the activity, which may be used for a decaying weighting, with more recent activity receiving a higher weight than "stale" activity that occurred farther in the past) that these topics or entities occur in the user activity.

Some embodiments of user activity monitor 270 or contextual information determiner 274 determine visits information, such as visits to a venue, from location user activity.

For instance, in some embodiments, user data (from 210) is monitored for information that may be used for determining current and historic user visit(s) to a location or venue. In particular, at a high level, contextual information determiner 274 or activity monitor 270 may use current user data, including location information, to determine or attribute the user's current location, which may be carried out by a location attribution function, described below. Based on the current location attribution, a visit for the user may be determined. In some embodiments, a current visit may be determined using features identified from the user data (including current or historical user data), such as how long the user is at a particular location. For example, user data indicating that a user was in the same approximate geographical location for a period of time is more likely to imply a visit occurred than user data indicating the user was only at a particular location briefly (such as in the case where a user is driving by a location, but not visiting it). Thus, a "visit" may indicate a degree of intention by the user to be at the user's current location. In some embodiments, a visit may be determined where a user remains approximately at the same geographical location over a timeframe. In contrast, merely passing through a current location or momentarily being at a current location may indicate that a visit has not occurred at the current location. Some embodiments may also consider user explicit signals, such as a user positively "checking-in" or otherwise affirmatively indicating a presence at a location.

User location history information associated with previous visits to the current location may also be used for determining a current visit, in some embodiments. For instance, in an embodiment, location history information about where a user just came from (the user's previous location) is used for facilitating visit identification, such as where disambiguation is used to identify information about the current visit. For example, where user location history information indicates that the user was previously at a restaurant, and current location information indicates the user is at another geographic location that has a coffee shop and a restaurant, then it may be determined, using disambiguation, that the user is more likely at the coffee shop than at another restaurant.

Some embodiments of contextual information determiner 274 or user activity monitor 270 may perform location attribution. Location attribution functionality in general, is responsible for determining location attribution from user data. The user data may be provided by a sensor, and indicates or may be used to determine location information, such as GPS, wireless communications (e.g., cellular or Wi-Fi Access Point), IP addresses associated with current user activity, user check-in/social-networking information, or other user data from which location information may be determined. In some embodiments, a location attribution function attributes the location to a place of interest to the user, such as locations frequented by the user. For example, in some embodiments, locations indicated by the location data may be clustered and the dense clusters used for determining those locations wherein a user spends time (e.g., at home, at work, or at the gym). Further, in some embodiments, a location attribution function performs filtering, which may remove location information outliers (e.g., a Wi-Fi-derived location data point from 300 yards away suggesting that the user is at that location); clustering; or other means to determine location data for attribution. Embodiments of location attribution functionality may determine current location and may also perform location attribution with location data associated with the user (such as logged user data or logged location information, which may be stored in a user profile such as historic location data stored in user profile 240). The current and historic location attributions may be used for determining user visits, including current and historical visits.

In some embodiments, contextual information determiner 274 determines contextual information related to a visit such as entities related to the visit (e.g., other people present at the location), any venue or venue-related information about the visit already known, or detected activity performed by the user at the location. By way of example and not limitation, this may include context features such as information about the location, such as venue information if known (e.g., the user's office location, home location, gym, etc.), time (including, for instance, arrival/departure times or duration of stay), day, and/or date, which may be represented as a time stamp associated with the visit, other user activity preceding and/or following the visit, other information about the visit such as entities associated with the visit (e.g., venues, people, objects, etc.), information detected by sensor(s) on user devices associated with the user that is concurrent or substantially concurrent to the visit (e.g., user activity detected via a computing device such as watching a streaming movie on an entertainment console, or motion information or physiological information detected on a fitness tracking user device, for example), user interaction on one or more user devices (such as browsing certain types of webpages, listening to music, taking pictures, composing email, or any other type of user device interaction), social media activity, or any other information related to the visit that is detectable that may be used for determining features or patterns associated with user visits.

Continuing with FIG. 2, feature-discriminator determination 280 is generally responsible for determining one or more features that may be used as discriminators for a search-result, or more specifically for a search-result entity. In some embodiments, each search result corresponds to an entity, which may be considered as an item or element of the search result, and which has properties or features that may be included in the search result that characterize this item or element. For example, a search initiated from a user voice command to "call John" may return several search results from the user's contacts or recent user history, such as 1: John Smith, 2: Jon Jones, 3: John the Plumber. Each of these search results includes an entity (i.e., John Smith, Jon Jones, John the Plumber) and may also include a set of one or more properties or features that characterize the entity, such as the phone number for each and the spelling of the entity name (e.g., John, John, and Jon). Additionally, other features related to these entities, but which may not be included in the search results, also may be determined by feature-discriminator determination 280 or its subcomponents. For example, some features may be determined based on user history associated with these entities (e.g., the user recently missed a call from John the plumber). As described herein, certain features related to the entities in search engine results may be determined and utilized as discriminators. These discriminators enable a user receiving a response to distinguish between multiple search results, or to more readily confirm a particular result, provided in the response by the computing system.

In some embodiments, feature-discriminator determination 280 receives search result information, which may be received from search-engine(s) interface 250 and receives feature-types information, which may be received from domain features determination component 260. Feature-discriminator determination 280 determines and outputs a set of one or more discriminators for a search result, which may be used to generate and provide a response to the user. In some embodiments, the set of discriminators may be ranked such that only the highest ranking (i.e., the strongest) discriminator(s) may be provided in an initial response generated and presented to the user. (However, in some embodiments, depending on the user's feedback or subsequent voice command, the next lowest ranked discriminator(s) may be utilized to generate a subsequent response to the subsequent voice command.)

As shown in example system 200, feature-discriminator determination 280 comprises entity determiner 282, entity feature determiner 284, feature similarity determiner 286, and discriminator determiner 288. Entity determiner 282, in general, is responsible for determining an entity in a search result. In some embodiments, each search result corresponds to an entity. By way of example and without limitation, an entity may comprise a specific contact in a search result of the user's contacts, a business or venue (e.g., a particular restaurant), an item that the user may purchase or has purchased, a website, a file or document in a search result from a files search, a particular song in a search result for a music search, or an element in a search result that may be considered a focus or target of the search result. The entity is identified in a particular search result by entity determiner 282 and extracted, logged, or otherwise noted. In some embodiments, an entity is determined based on the descriptive information included in the search result, based on the search query, and/or based on the search domain(s) determined from domain identifier 262. In some embodiments, rules or logic may be used to identify an entity, and in some embodiments, entity determiner 282 determines and outputs a set of likely entities included in a search result; each potential entity may have a corresponding confidence score that the identified entity is the entity represented by the search result, and a threshold applied so that only those entities with a sufficient confidence are provided. For instance, in an embodiment, the confidence threshold is 0.6. In another embodiment, the confidence threshold is more than fifty percent (or greater than 0.5). In some embodiments, entity-information for each search result may be provided by the search engine(s), and thus may be received from search-engine(s) interface 250.

Entity feature determiner 284, in general, is responsible for determining features associated with an entity. These features, determined by entity feature determiner 284, are evaluated (by other subcomponents of feature-discriminator determination 280) to determine one or more discriminators for the entity. Embodiments of entity feature determiner 284 receive entity information for a search result (which may be determined from entity determiner 282) and receive a set of one or more feature-types (which may be determined from domain features determination component 260 or the features-type determiner 264 subcomponent). Entity feature determiner 284 then uses the feature types to determine a set of one or more features of an entity of the search result. In particular, the feature types may be used to determine specific features, which may include feature values corresponding to the feature types. Accordingly, in some embodiments, entity feature determiner 284 uses the set of feature types to determine which feature types and corresponding values (i.e., features) are present in the search result (or metadata of the search result), which may be received from search-engine(s) interface 250.

Thus, by way of example and as described previously, if a search domain is restaurants, two of the feature-types might include the business hours and the cuisine. For a particular search-result entity, such as a particular restaurant, the features would include the specific hours that this restaurant is open and the specific cuisine served at this restaurant. Similarly in the music example described previously, for the music domain, the feature types might include artist, genre, and year released, among other possible feature types for this domain. Thus, for a particular search-result entity in this domain, such as the song Fly Away, the specific features corresponding to these three feature types would be: Lenny Kravitz (artist), alternative rock (genre), 1998 (year released). In some embodiments, the output of entity feature determiner 284 is a set of key-value pairs (KVP), which may comprise a KVP vector, such as feature-type: feature-value, for a search result or associated with an entity in a search result. In some embodiments, entity feature determiner 284 determines a set of feature-type: feature-value KVPs (or a KVP vector) for each search result.

As described previously in some embodiments, features and feature types may be considered to be global or inherent to the entity (i.e., features that characterize the entity without regard to a specific user) and personal to the user (i.e., personal features that are related to user activity or user experience with an entity). As shown in example system 200, entity feature determiner 284 includes subcomponents global-features determiner 285-A and personal-features determiner 285-B. Global-features determiner 285-A, in general, is responsible for determining global features associated with an entity. In some embodiments, global-features determiner 285-A receives a set of feature types (which may be received from features-type determiner 264) and one or more search results (and/or metadata associated with a search result), and determines which global feature types have feature values (i.e., features) present in the search results (or metadata).

In some instances, information about a particular feature corresponding to a feature type may not be present. For example, in the restaurant domain, the search-result information of a particular restaurant may not specify a cuisine. In these instances, because this feature is missing, it may be omitted (or simply not included) in the set of features outputted by entity feature determiner 284 that will be evaluated to determine a discriminator. However, in some embodiments, global-features determiner 285-A may conduct an additional searching operation for a missing feature type to determine a likely feature value. For instance, in the above example of a restaurant, a subsequent searching operation may be performed on the restaurant (the entity in the search result). In some instances, this query may include the feature type as well. So if the restaurant's name is Green Hen, this query might comprise "Green Hen restaurant cuisine type." In this way, global-features determiner 285-A may determine the feature when it is missing from the original search results information.

Some examples of global features are described above in connection to features-type determiner 264. Two particular feature types that are relevant to many of the embodiments used for voice-based implementations described herein include entity spelling and entity pronunciation. This is because, for voice-based interactions, where words within a user's request are homophones or otherwise have a similar pronunciation to other words, the virtual assistant (or the computing system) may be unable to determine the user's intent for the spoken request. For example, if the user's spoken request is to "call John" and the user's contacts list includes a John and a Jon, which are both pronounced identically, then the virtual assistant (or computing system) is unable to determine which entity—which person, John or Jon—to call. Accordingly, in these instances, where the pronunciation features for two or more entities is determined to be similar or identical, then the spelling feature may be considered for use as a discriminator. Thus in the above example, the virtual assistant may respond with "Did you want to call John with an h?" (If the user replies no, then the virtual assistant may subsequently respond with "OK, I have another Jon spelled J-O-N, did you want to call this Jon?"). Similarly, the virtual assistant may respond in the first instance with "Did you want to call John with an h or Jon spelled -J-O-N?" In some instances, a pronunciation feature may be personal rather than global, depending on whether a user has a different pronunciation than the common or popular pronunciation of an entity.

Personal-features determiner 285-B, in general, is responsible for determining personal features associated with an entity. Embodiments of personal-features determiner 285-B utilize feature-types and search results information to identify and extract personal features from user activity information and user data. In some embodiments, personal-features determiner 285-B performs one or more searching operations on user activity and user data, which may be stored in a user profile 240 (and more specifically in user activity information component 242 and/or user account(s) and device(s) 244), received from user-data collection component 210, or determined from user activity monitor 270. The searching operations may be based on a search-results entity, domain information, feature types or features, and/or other search result information. By way of example and without limitation, a search in the contacts domain with search results that include a user-contacts entity, a searching operation, or user activity and user data, may comprise searching user communications with the contact entity (e.g., previous or missed calls, emails, messages, for example) and/or other user data indicating a relation or contextual information about the contact entity (e.g., user accounts such as email and social media information, corporate directories for email, calendar entries, meetings, project groups, or other user data relating to the contact entity, for example). For instance, if the user request was to call John, and the search results included a contact entity John, then personal-features determiner 285-B will determine features about this entity that are related to the user. So if the user called this particular John yesterday, then this may be considered a personal feature. (And if this personal feature is determined to be a discriminator, then the response to the user's request might be "Do you want to call the John you called yesterday?") In some embodiments, the search may comprise searching the user activity information or user data for a global feature of this entity, such as searching the user's activity for the specific phone number (a global feature) of this particular John. Similarly, if the user and this particular John were having a meeting at 11 a.m. today on the user's calendar, then this may be considered a personal feature. (And if this personal feature is determined to be a discriminator, then the response to the user's request might be "Did you want to call the John you have a meeting with at 11 a.m. today?")

In this way, personal-features determiner 285-B may determine personal features related to a search-result entity, for example and without limitation: that the entity communicated with the user previously (e.g., "Do you want to call the John who called you yesterday?" or "Do you want to call the John who emailed you last week?"); that the user works with or is social media friends with a particular entity person; that the user visited a particular entity venue previously or has a pattern of visiting the venue (e.g., the user visits this venue every Saturday, as described above); particular items or products that the user purchased or owns; places where the user lives, works, works out (which may be referred to as hubs and which may be determined based on locations the user typically spends time in the evenings and during the workday or based on physiological data or YPID or location-lookup, in the case of a gym or other minor hubs); song/play lists; media subscriptions; media consumption (e.g., movies watched) or media-consumption habits (e.g., the user has a pattern of watching a particular television show or playing a particular game); applications or apps installed, currently opened, or used recently; websites browsed or online activity; or nearly any other user data or user activity that is determined to be associated with a search-results entity.

In some embodiments, personal-features determiner 285-B may perform searching operations on user data or user activity information from friends of a particular user or other users similar to the user. In this way, personal features may include information relating a user's friends and a search entity. (Thus if these personal features are determined to be a discriminator, then for instance, a response to a user request for directions to the Green Hen restaurant might be, "Do you want to directions to the Green Hen restaurant that your friends go to or the one by your house?") For these embodiments, consent may be obtained from those other users before searching their user activity or user data.

In some embodiments, entity feature determiner 284 or its subcomponents may perform one or more supplemental searching operations on a particular feature to obtain additional information that may be used when evaluating the feature as a discriminator. Further, in some embodiments, the additional information obtained from the additional searching operations may comprise a new feature or features. For example, suppose that a user has multiple Johns in his contact list. In response to a user request to "call John," a supplemental search on a particular feature (such as the phone number feature) may determine that one of the John's phone numbers matches a plumber business in a business listing, for example. This supplemental information may be utilized as an additional feature, in some embodiments. (So if this additional feature is determined to be a discriminator, then a response by the computer system to the user request might be, "Did you want to call John the plumber?")

Continuing with FIG. 2 and the subcomponents of feature-discriminator determination 280, feature similarity determiner 286, in general, is responsible for comparing feature values for the same (or similar) feature types in order to determine similarity or differences. In particular, features that are determined to be similar may be excluded from consideration, or less likely, to be used as a discriminator. Features that are determined to be different may be more likely to be used as a discriminator, because these differing features may better enable a user to differentiate between search-result entities.

In some embodiments, feature similarity determiner 286 uses feature comparison logic 230 to determine similarity among features. Feature comparison logic 230 can include rules, conditions, associations, classification models, or other criteria to determine feature similarity. For example, in one embodiment, feature comparison logic 230 may include a set of rules for comparing feature values for identical feature types, and determining a level of similarity feature values of similar feature types. For instance, some embodiments may utilize classification models such as statistical clustering (e.g., k-means or nearest neighbor) or a proximity of features to each other on a semantic knowledge graph, neural network, or other classification techniques to determine similarity. In particular, different similarity techniques may be used for different types of features. Accordingly, feature comparison logic 230 can take many different forms depending on the mechanism used to identify similarity and the feature types for which similarity is being determined. For example, the feature comparison logic 230 may comprise static rules (which may be predefined or may be set based on settings or preferences in a user profile associated with the user), Boolean logic, fuzzy logic, neural network, finite state machine, support vector machine, logistic regression, clustering, or machine learning techniques, similar statistical classification processes, other rules, conditions, associations, or combinations of these to identify and quantify feature similarity.

In some embodiments, feature similarity determiner 286 determines a similarity score or similarity weighting for a feature. In some embodiments, feature similarity determiner 286 may output a feature similarity vector of similarity scores, which may correspond to a feature vector for a search-result entity. The similarity score may be used by discriminator determiner 288 to rank features based on their level of difference (or effectively ranking them in terms of their ability to function as discriminators). Thus, a score indicating a high-degree of similarity implies that the particular feature will be less effective as a discriminator because it is similar to other features. For example, suppose two search results each include a venue entity for a particular pharmacy chain, and both entities have features for business hours and features for location. Suppose further that the business hours are identical (e.g., both locations are open 24 hours) and the locations are different (e.g., one location is on Broadway and one location is on Main Street). Hence, both locations of the pharmacy have the same business hours. In this example, it would not be helpful to use the business hours as a discriminator to differentiate between the two entities because a user could not differentiate between the two entities based on their business hours, which are the same. However, the location feature is not the same and thus may be an effective discriminator feature. For instance, a user might be able to determine whether they wanted to call the pharmacy on Broadway or the pharmacy on Main Street.

Similarly, two products (search-result entities) that a user is contemplating purchasing may have identical brand features and size features, but different color features (e.g., one is red and the other is blue). In this case, the brand and size features would have high similarity scores and thus these features probably would not be determined as discriminators by discriminator determiner 288. Whereas the color feature would have a low similarity score (red vs. blue) and thus might be determined to be a discriminator by discriminator determiner 288.

In some instances, certain types of features may not be compared for similarity because these features may not be present among more than one search-result entity. For example, some personal features that comprise a user experience related to a particular entity may not be present for the other search-result entities because the user does not have that same personal experience with the other search-result entities. (An exception is a binary representation of a personal feature; e.g., the user either has or does not have a particular user activity information or user data related to the entity. For instance, for two contact entities named John, suppose one of them has called the user and one of them has not. For this type of personal feature, it may be possible to compare similarity, which would either be identical or different because of the binary states of the feature.)

In some embodiments, feature similarity determiner 286 performs a comparison of pronunciation features of the search-result entities to determine if any two or more entities are homophones (e.g., John vs. Jon) or have similar pronunciations (e.g., John vs. Juan). Where this is determined, it may be logged, noted, or otherwise indicated, and a feature comparison of the spelling feature may be performed. Where the spelling is different but the pronunciation is similar, the spelling feature may be weighted or scored so that it is more likely to be determined as a discriminator by discriminator determiner 288. Further, in the circumstance that the spelling feature and the pronunciation feature are both similar (i.e., two or more entities are homonyms), then neither the spelling nor pronunciation features will likely be used as discriminators (i.e., both may be given a high similarity score) and thus another feature or features (having lower similarity scores) will be determined to be a discriminator. For example, if the user has two Johns in her contact list, then neither the spelling feature nor pronunciation features will likely be determined to be discriminators because the spelling and pronunciations are identical. (Instead, it is likely that another feature, such as last name, phone number, or a personal feature (e.g., the user's experience or relation to one of the Johns) may be used as a discriminator, for example.)

Discriminator determiner 288, in general, is responsible for determining a feature that may be used as a discriminator for a search-result entity. In some embodiments, a set of one or more discriminators may be determined for a search-result entity by discriminator determiner 288, and further, in some embodiments, a plurality of discriminators determined by discriminator determiner 288 may be ranked. Embodiments of discriminator determiner 288 utilize the set of entity features (or feature vectors) determined by entity feature determiner 284 to determine a set of one or more feature discriminators for an entity, and may also use feature similarity score(s) determined by feature similarity determiner 286. In particular, features for a first entity having a high similarity to features of a second (or other) entities may be excluded from being a discriminator, or these features may be ranked lower.

In some embodiments, discriminator determiner 288 determines a discriminator score (or weighting) for a feature, indicating a level or degree for which the feature may be effective as a discriminator. (Thus for instance, two features having high similarity scores would be expected to have low discriminator scores because these features are likely to be less effective for being used to differentiate between entities.) Moreover, in some embodiments, the discriminator scores may be utilized to rank the features as discriminators, while in some embodiments a threshold may be applied to the discriminator score such that only features having a corresponding discriminator score that satisfies the threshold may be utilized as discriminators.

In some embodiments, contextual information, which may be provided by user activity monitor 270 (or contextual information determiner 274) may be utilized to determine a discriminator or a discriminator score for a feature. For example and without limitation, such contextual information may include the user's current location, the time of day/date, traffic conditions, previous locations visited by the user, whether the user is traveling or out of routine, or current activity of the user. For instance, suppose two search-result entities for a pharmacy include a first feature for location and second feature for opening hours. If the current context indicates the user is driving and it is during the day when the opening hours features indicate both pharmacies are open, then in response to a user request to call a pharmacy, the virtual assistant (or computing system) may generate a response that uses the location feature as a discriminator. Thus, for example, "Did you want to call the pharmacy by your office or the one that's nearby?" However, if the current context indicates that it is at night, and the opening hours features indicate that one of the pharmacies is not open, then the response might be "Do you want to call the pharmacy that is open now?" (Alternatively, the virtual assistant or computing system may simply utilize the opening hours feature discriminator to call the pharmacy that is opened now, without asking the user for confirmation.)

Some embodiments of discriminator determiner 288 may utilize probabilistic classifications or employ discriminator-determining logic 235 to determine features that are discriminator(s). Discriminator-determining logic 235 includes rules, conditions, associations, classification models, or other criteria for analyzing or comparing features to determine or classify a particular feature as a discriminator. In some embodiments, for particular features, the classification may be binary or may be on a spectrum, such as a score or weight associated with the feature. Thus, some embodiments of discriminator-determining logic 235 determine a feature-discriminator score or weighting representing how effective a particular feature may be if used to differentiate a first search-result entity from another.

In some embodiments, discriminator-determining logic 235 may rank the weighted or scored features, and output a ranked list of features for use as discriminators. In some embodiments, discriminator-determining logic 235 (or response generation logic 237, described below in connection to response generation 290) may utilize user preferences, user feedback or a discriminator model (also described below) with a ranked list of feature discriminators to determine a particular set of one or more discriminators to use for generating a response to a user request. In some embodiments, discriminator-determining logic 235 may specify applying a threshold to the score such that only those features with scores satisfying the threshold may be utilized as discriminators.

In some embodiments, discriminator-determining logic 235 employs rules to determine which features or feature types are more likely to be better discriminators (i.e., to better enable a user to differentiate between or among entities). For example, rules may specify determining discriminators based on the domain information associated with a search-result entity. For example, if the domain is a restaurant, then the discriminator may comprise a location feature and/or a cuisine feature. Similarly, if the domain is a user contact, then the discriminator may comprise a personal feature (such as a relation between the user and the contact (e.g., "Did you want to call your brother, John?") or a recent experience with the contact (e.g., "Did you want to call the John you called last week?"). As another example, rules may specify utilizing a similarity score for features (or for specific features or particular type of features) so that features that are more different (e.g., having a lower similarity score) may be more likely to be classified as a discriminator. Similarly, discriminator-determining logic 235 (or rules utilized by discriminator-determining logic 235) may specify that personal features should be favored (and thus scored or weighted higher) over global features. This is because often users will remember a personal experience with an entity. By way of example, for a particular pharmacy at a particular location, for many users it may be easier to distinguish the pharmacy based on the user's experience with the pharmacy rather than the pharmacy's location. Thus, in this example a personal feature such as a prior call to the pharmacy by the user may be classified as a better discriminator than the pharmacy's location. (Therefore a more effective response to a user request to call the pharmacy might be, "Did you want to call the pharmacy you called last week?" rather than "Did you want to call the pharmacy on Main Street?"

In some embodiments, discriminator-determining logic 235 includes logic specifically for handling pronunciation and spelling features indicating that two or more entities may be homophones or homonyms. For example, as described in connection with feature similarity determiner 286, a feature comparison operation may detect a likely occurrence of homophones or homonyms. In these circumstances, these embodiments of discriminator-determining logic 235 can determine—for instance, in the case of a homophone (i.e., entities with different spellings by similar pronunciation)—that a spelling feature should be utilized as a discriminator (or receive a higher discriminator score and thus be ranked more highly). Similarly, for instances of homonyms (i.e., similar spelling and pronunciation of entities), discriminator-determining logic 235 may include rules specifying that neither the spelling nor pronunciation features should be determined as discriminators (or that these features should receive a low discriminator score).

In some embodiments, discriminator-determining logic 235 may utilize contextual information, such as described previously. For example, given certain contextual information, discriminator-determining logic 235 may vary a score or ranking of features as discriminators. In some of these embodiments, discriminator-determining logic 235 may specify favoring (i.e., weighing or scoring higher) personal features based on current contextual information as discriminators over other personal features or global features. For example, if the current context indicates a user's present location is near the location of a particular search-result entity (which may be determined based on a location feature associated with the entity), then discriminator-determining logic 235 may specify that this feature should be classified as a discriminator or should receive a higher discriminator score or weighting. Similarly, if the current context and opening hours features indicates that two or more venue entities are presently open, then discriminator-determining logic 235 may determine that opening hours should not be a discriminator; whereas if the current context is nighttime and only one of the venue entities is open, then discriminator-determining logic 235 may specify that opening hours should be a discriminator. (Thus, for example, a response provided to the user might comprise "Do you want to call the pharmacy that is open now?") Yet another example of current contextual information that may be utilized by discriminator-determining logic 235 includes traffic conditions. Thus, for example, where traffic conditions for traveling to two venue entities are different (especially if the two locations are relatively similar distances away from a user or in the case where there is an accident or road closure that alters the typical traffic time), a traffic times feature may be utilized as a discriminator.

In some embodiments, discriminator-determining logic 235 may include logic for weighing personal features as discriminators based on recency (or the freshness or staleness) of the user activity or event represented by the personal feature. For example, in some embodiments, discriminator-determining logic 235 may weight or score a feature based on how recently the user activity occurred, or may specify that only user activity within a certain timeframe (e.g., within six months for a visit to a venue or within 30 days for a communication such as a call) should be considered when evaluating a personal feature as a discriminator. (For instance, a personal feature indicating that a user called a particular entity 5 years ago may be an ineffective discriminator.) For example, for an entity that is a song, discriminator-determining logic 235 may evaluate as a discriminator a personal feature representing user history for listening to the song, such that the disseminator score is based on how recently the user listened to the song. For instance, the score may be higher (and thus the personal feature more likely to be a discriminator) if the user has more recently listened to the song and lower if the user has not listened to the song recently. In some embodiments, a temporal threshold may be applied to personal features that comprise user history information, and further, in some embodiments, the temporal threshold may be based on the particular personal feature. For example, for a personal feature representing a call with a particular entity, the threshold may be in the last 60 days. While a temporal threshold for a personal feature representing a visit to a physical venue may be within six months.

In some embodiments, discriminator-determining logic 235 may employ or create one or more feature discriminator models 248. In some embodiments, a feature discriminator model 248 may be initially configured to use rules or conditions, such as described above (for instance, determining discriminators based on the domain information), but then the feature discriminator model 248 may adapt to be specific to the user based on user feedback (which may be determined by user feedback 299) or user preferences 246, as described herein. For instance, in one embodiment, a user may configure her preferences to avoid using collecting and using personal information (i.e., user activity or user data) as features. Under this configuration, feature discriminator model 248 (or discriminator-determining logic 235) may specify using global features only. Thus, in some embodiments, user preferences 246 or user feedback, may be captured or represented in a feature discriminator model 248, such as model type, weights, and/or coefficients.

In some embodiments, a feature discriminator model 248 comprises a machine-learning model, and in some embodiments, one or more neural network-based models may be employed. For example, in an embodiment, a neural network may be utilized for classifying personal features as discriminators wherein the input to the model may include one or more of domain information, search result information, user activity or user data, which may include contextual information, and user feedback or preferences. In some embodiments, model weights (or model coefficients) may be tuned based on user feedback or user preferences. (For instance, as described herein, in some embodiments, user feedback 299 may update a feature discriminator model 248 based on user feedback so that certain features may be more or less likely to be classified as discriminators or may receive a lower or higher discriminator score or weighting.) In this way, these embodiments of the disclosure are adaptive and can learn from user interactions.

In some embodiments, the particular feature discriminator model 248 utilized by discriminator-determining logic 235 may be based on a particular feature or feature type being analyzed for use as discriminators. Accordingly, discriminator-determining logic 235 can take many different forms depending on the particular features or feature types being compared or analyzed and the mechanism(s) used to classify a feature as a discriminator and/or determine a discriminator score. In some embodiments, discriminator-determining logic 235 may utilize fuzzy logic, or feature discriminator model 248 may comprise a neural network, finite state machine, support vector machine, logistic regression, clustering, or machine-learning techniques, similar statistical classification processes, or combinations of these to determine a discriminator. For example, the discriminator-determining logic 235 may include labeled training data, which may be based on historical differentiators from one or more users, and used to train a neural network classifier (an example of particular feature discriminator model 248) used for determining whether a newly determined feature should be classified as a discriminator (and in some embodiments, to what degree or with what weighting or score).

In some embodiments, discriminator-determining logic 235 may specify rules or conditions for utilizing user feedback, to an initial response provided to the user, to determine subsequent discriminators in subsequent responses to user voice interactions. (As described herein, user feedback may be received from user feedback 299.) For example, in an embodiment, based on user feedback, a ranked list of feature discriminators may be re-ranked so that a different discriminator (or discriminators) is presented to the user in a subsequent response to a user request. In one embodiment, discriminator-determining logic 235 may specify using a first feature (or set of features) or feature type(s) as a discriminator, and then based on certain feedback indicating user confusion or that the user is unable to differentiate or make a decision, utilizing a second feature (or set of features) as a discriminator(s), and so on. In some embodiments, discriminator-determining logic 235 may include functionality for creating new rules or logic based on user feedback.

In some embodiments, discriminator-determining logic 235 may specify that user feedback should be incorporated into a feature discriminator model(s) 248, and may further update the model based on the received feedback, such as by updating the model weights, for instance. For example, certain user feedback may indicate that a genre feature type is not helpful as a discriminator for a certain user, and thus, discriminator-determining logic 235 may log that the genre feature type is not an effective discriminator, may decrease the weighting associated with this feature type so that a discriminator score determined for this feature type is lowered, or may update feature discriminator model(s) 248 to deemphasize (e.g., lower the weighting) the genre feature type. Feature discriminator models updated (or created) by discriminator-determining logic 235 may be accessed or stored in feature discriminator model(s) 248 of a user profile 240.

Continuing with FIG. 2, response generation 290 in general is responsible for generating a response by the computer for a voice-based interaction with a user, which may be generated and provided to a user following a user request including a voice command. Embodiments of response generation 290 may receive search results from search-engine(s) interface 250 and a corresponding feature discriminator (or set of discriminators, which may comprise a ranked list) determined from discriminator determiner 288 (or more generally from feature discrimination determination 280). An embodiment of response generation 290 then generates a response using at least one search-result entity and a corresponding discriminator. In some embodiments, more than one discriminator may be included in a generated response or utilized to generate a response. (For example, the response, "Did you want the pharmacy nearby or the pharmacy you visited last week?" includes two discriminators: a location feature discriminator and a personal feature discriminator.) In some embodiments, the generated response may comprise a text response, which may be converted to speech for playback to a user by a text-to-speech program. (For example and as described below, in some embodiments, presentation component 220 comprises a text-to-speech program or service for converting textual information into speech so that the voice-based interaction between a user and computer system can transpire.)

At a high level, when generating a response, some embodiments of response generation 290 may simplify aspects of a search result, such as pruning extraneous information from the search result; for instance, other features that are not discriminators may be omitted. Similarly, some features may be aggregated or generalized. Some embodiments of response generation 290 may personalize information to be presented, such as by supplementing or modifying aspects of a search result. For instance, a discriminator may be modified or supplemental information about the discriminator may be added in order to personalize it (e.g., by replacing an address with location information that is relative to the user, such as presenting location in relation to where the user lives or works).

As shown in example system 200, response generation 290 comprises search-result simplification 292, personalization 294, and response generator 296. Further, some embodiments of response generation 290 or its subcomponents may utilize response generation logic 237 to generate a response or to facilitate carrying out functions associated with the subcomponent, such as simplification or personalization.

Search-result simplification 292, in general, is responsible for modifying a search result for presentation to a user such as by pruning, extracting details from a search result, or otherwise simplifying a result to be utilized as part of a response. It is an objective of some of the embodiments described herein, and as shown by many examples provided in this disclosure, to generate and provide to the user with a response that includes an identification of a search-result entity and one or more discriminators that enable the user to distinguish that entity from another, but does not necessarily include extraneous details in the response. Accordingly, in some embodiments, search-result simplification 292 performs simplification by removing extraneous information from a search result. For example, these embodiments of search-result simplification 292 may remove those features (and related metadata) that are not determined to be a discriminator or that have a low discriminator score. For instance in the above example of two pharmacies with identical opening hours, the opening hours feature (and other related information about opening hours) may be omitted from a response, because this feature is not likely to be used by a user to distinguish a pharmacy identified in the response from another pharmacy with identical opening hours. Alternatively, search-result simplification 292 may be considered to extract key information from a search result response such as an indication of the entity and the set of discriminator features, which then may be used by other subcomponents of response generation 290 to generate a response. In some instances, it may not be necessary or desired to simplify a search result before it is presented to a user.

In some embodiments, search-result simplification 292 may perform aggregation or generalization on features in a search result. In particular, in some embodiments, response generation logic 237 may be utilized by search-result simplification 292 and may include logic for aggregating features together or for generalizing feature information. By way of example and without limitation, suppose for a contacts entity in a search result, a first feature indicates that the entity is a coworker and a second feature indicates that the entity is on a project team with the user. Because the entity is on a project team with the user, then the entity is a coworker, since being on the same project team implies being a coworker; therefore, information about these features may be aggregated, such as by including information only about one of these features. Similarly, feature information may be modified to be more generalized. For example, a specific address at a location in a particular region may be modified to just the region instead of the specific address (e.g., "Do you want to call the pharmacy that is downtown?" or "Do you want to call the restaurant in Bellevue or the one in Redmond?"). As another example, where personal features indicate a contact entity called a user five times yesterday, response generation logic 237 may aggregate or modify this information to be simply that the contact called the user yesterday (e.g., "Do you want to call the John who called you yesterday?").

Personalization 294, in general, is responsible for personalizing aspects of a search result or related information to be included in a response generated by response generation 290. Embodiments of personalization 294 may supplement or modify the information to be provided in a response. In particular, personalization 294 may determine additional information to be included regarding a discriminator or may modify a discriminator or other aspects of a search-result entity in order to personalize the response to a user or further clarify the response. By way of example and not limitation, personalization 294 might modify a location discriminator to be more personal to a user by replacing its address with location information that is relative to the user, such as expressing the location in relation to where the user is currently located, lives, or works, (e.g., "the pharmacy near your office" instead of "the pharmacy on Broadway"). Similarly, the location address might be expressed in relation to a landmark (e.g., "the pharmacy near the Space Needle"). Accordingly, in some embodiments, a discriminator may not necessarily be explicitly included in the generated response, but in some instances, it may be used to generate a response with supplemental or alternative information, thereby enabling a user to differentiate a particular entity or make a decision, such as in the previous example.

Some embodiments of personalization 294 utilize response generation logic 237 to generate a response or to facilitate supplementing or modifying information to be included in a response. Response generation logic 237 generally includes rules, conditions, associations, models, or other criteria for generating a user response. Response generation logic 237 may utilize fuzzy logic, machine-learning techniques, gradient boosting, clustering, other statistical classification processes, or combinations of these.

In some embodiments, response generation logic 237 may further include logic for generating a response that is personalized to the user or that otherwise enables a user to more straightforwardly or quickly distinguish a particular entity. In some embodiments, response generation logic 237 may utilize the discriminator(s) for an entity to determine whether to supplement or modify information to be included in a response. In particular, in some embodiments, response generation logic 237 can include logic for performing a supplemental search operation using discriminator or entity information or other features associated with the entity, to determine the additional information that may be included.

Some embodiments of personalization 294, response generation logic 237, or response generation 290 may employ one or more response personalization models 249. In particular, response personalization models 249 may be utilized to determine optimal formats for presenting information to a user. A response personalization model 249 may be specific to a particular domain and/or specific to a particular discriminator. In this regard, response personalization models 249 may comprise a set of models.

In some embodiments, a response personalization model 249 may comprise a machine-learning model, such as decision tree or random forest, semantic knowledge graph, a neural network, finite state machine, support vector machine, logistic regression model, or other machine learning model. In an embodiment, response personalization model 249 comprises a set of weighted rules, which may comprise pre-determined rules, rules determined from user feedback or preferences, a combination thereof. In some embodiments, information about user feedback or user preferences may be represented in a response personalization model 249. For example, a user may indicate that she prefers relative location over address information (i.e., expressing a location in relation to the user's current location, where the user lives, or works, or known landmarks, for example). Similarly in some embodiments, user preferences or feedback may specify not to personalize responses. For example, a smart speaker in a shared environment may be configured (as user preferences or settings) not to personalize responses for a particular user. In these embodiments, response personalization model 249 may not be employed or may be used and may include rules specifying not to apply personalization techniques.

Response generator 296, in general, is responsible for generating or synthesizing a response by the computing system in a voice-based interaction with a user. Embodiments of response generator 296 may utilize a search-result entity or search result information and the one or more corresponding discriminators, which may be determined by discriminator determiner 288, to generate a response. In some instances, the generated response may comprise a search-result entity and a discriminator. In some embodiments, more than one discriminator may be included in a generated response or utilized to generate a response, as described previously. Further, in some embodiments, response generator 296 may formulate a question for the user based on the entity information and a discriminator; for instance, "Did you want to call your coworker John?" or "Do you want directions to the pharmacy by the Space Needle?" In some embodiments, response generator 296 assembles a response based on the output of search-result simplification 292 and personalization 294.

In some embodiments, where a plurality of ranked discriminators are determined for a particular search-result entity, response generator 296 (or other subcomponents of response generation 290) may utilize the highest ranked discriminator for generating an initial response. In particular, in some embodiments, based on user feedback indicating confusion or inability to differentiate, the next highest ranked discriminator(s) may be used in subsequently generated responses within the same voice-based interaction session, or the list of discriminators may be re-ranked.

In some embodiments, the generated response may comprise a text response. For embodiments implemented using a smart speaker (or a voice-based virtual assistant application operating on a user device), the generated text response may be converted to speech by a text-to-speech program for playback to a user over the smart speaker (or over a speaker in or connected to the user device). For example and as described below, in some embodiments, presentation component 220 comprises a text-to-speech program or service for converting textual information into speech so that the voice-based interaction between a user and computer system can transpire.

Continuing with FIG. 2, example system 200 also includes user feedback 299. User feedback 299, in general, is responsible for processing user feedback to a computer-generated response to an initial user request, such as a voice command. In particular, embodiments of user feedback 299 may incorporate a user's feedback (which may be received in a subsequent utterance by the user after the user receives a response to a voice-based command) into the logic for determining and generating future responses to user requests. Some embodiments of user feedback 299 also may incorporate into this logic the user preferences, which may be specified as a setting configuration in user preferences 246.

As described previously, user feedback 299 may incorporate user feedback or user preferences into feature-discriminator model(s) 248 and/or response personalization model(s) 249. In particular, in some embodiments, user feedback 299 may update the model weights, coefficients, rules or decision trees, or other aspects of models 248 and 249 based on user feedback. For instance, a feature discriminator model 248 may be updated so that certain features may be more or less likely to be classified as discriminators or may receive a lower or higher discriminator score or weighting. Similarly, a personalization model 249 may be updated based on user feedback, as described previously. In this way, these embodiments of the disclosure are adaptive and can learn from user interactions.

Moreover, some embodiments of user feedback 299 may utilize discriminator-determining logic 235 or response generation logic 237 to update models 248 and 249. For instance, as described in connection with feature discrimination determination 290, discriminator-determining logic 235 may specify that user feedback should be incorporated into a feature discriminator model 248, and may further update the model based on the received feedback, such as by updating the model weights, for instance. For example, certain user feedback may indicate that a genre feature type is not helpful as a discriminator for a certain user, and thus discriminator-determining logic 235 may log that the genre feature type is not an effective discriminator, may decrease the weighting associated with this feature type so that a discriminator score determined for this feature type is lowered, or may update feature discriminator model 248 to deemphasize (e.g., lower the weighting) the genre feature type.

In some embodiments, where a plurality of ranked discriminators are determined for a particular search-result entity, user feedback 299 may facilitate re-ranking the discriminators based on user feedback. For example, an initial highly ranked discriminator may be re-ranked based on user feedback indicating that the particular discriminator is not helpful. Alternatively, user feedback 299 may specify that a subsequently generated response should use the next highest ranked discriminator in a subsequent response to the user, in order to provide more clarity and resolve the confusion. Further, in some embodiments, user feedback 299 may specify that a new search should be performed, based on user feedback. For example, in the situation where none of the search results are consistent with the user's intent, user feedback 299 may specify that an additional searching operation may be performed, which may include searching over a different domain, and user feedback 299 may pass parameters for the search to search-engine(s) interface 250.

Example system 200 also includes a presentation component 220 that is generally responsible for presenting to a user the responses generated by response generation 290. Presentation component 220 may comprise one or more applications or services on a user device, across multiple user devices, or in the cloud. For example, in one embodiment, presentation component 220 manages the presentation of content to a user across multiple user devices associated with that user. In some embodiments, presentation component 220 includes or utilizes a text-to-speech program or service for converting a text-based response (which may be provided by response generation 290) into speech, thereby enabling a voice-based interaction between a user and computer system.

In some embodiments, presentation component 218 may determine on which user device(s) a response is presented, as well as formatting parameters of the presentation (e.g., audio properties which may include the characteristics of a synthesized or computer-generated voice, speaking rate, pitch, tone, volume, and/or visual properties for some embodiments). Presentation component 220 may facilitate providing content, such as a generated response to a user request, via one or more presentation component(s) 716 of a computing device 700, as described in connection to FIG. 7. For example, presentation component 220 may facilitate providing computerized speech, generated based on a response from response generation 290, to an acoustic speaker associated with a computing device. In some embodiments, presentation component 218 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

Storage 225 generally stores information including data, computer instructions (e.g., software program instructions, routines, or services), logic, profiles and/or models used in embodiments of the disclosure described herein. In an embodiment, storage 225 comprises a data store (or computer data memory). Further, although depicted as a single data store component, storage 225 may be embodied as one or more data stores or may be in the cloud.

As shown in example system 200, storage 225 includes one or more user profiles 240, feature comparison logic 230, discriminator-determining logic 235, and response generation logic 237. Some embodiments of example user profile 240 may include information associated with a particular user or, in some instances, a category of users. As shown, user profile 240 includes user activity information component 242, user account(s) and device(s) 244, user preferences 246, feature-discriminator model(s) 248, and response personalization model(s) 249, some of which have been described previously. The information stored in a user profile 240 may be available to the routines or other components of example system 200.

As described previously, user activity information component 242 generally includes user information about user actions or activity events, related contextual information, or other related information, which may be determined via user activity monitor 270, and may include historical or current user activity information. User account(s) and device(s) 244 generally includes information about user devices accessed, used, or otherwise associated with the user, and/or information related to user accounts associated with the user; for example, online or cloud-based accounts (e.g., email, social media) such as a Microsoft® Net passport, other accounts such as entertainment or gaming-related accounts (e.g., Xbox live, Netflix, online game subscription accounts, etc.); user data relating to such accounts such as user emails, texts, instant messages, calls, other communications, and other content; social network accounts and data, such as news feeds; online activity; and calendars, appointments, application data, other user accounts, or the like. Some embodiments of user accounts and devices 244 may store information across one or more databases, knowledge graphs, or data structures. As described previously, the information stored in user accounts and devices 244 may be determined from user-data collection component 210 or user activity monitor 270.

User preferences 246 generally include user settings or preferences associated with user activity monitoring. By way of example and not limitation, such settings may include user preferences regarding whether and how personal features are utilized, configurations for specific features or feature types discriminators, such as preferred features or feature types to be considered for use as discriminators, settings specifying how many search-result entities a user prefers to receive in a response, or other configurations described herein. Feature-discriminator model(s) 248 are described previously in connection to feature-discriminator determination 280, and response personalization model(s) 249 are described previously in connection to response generation 290.

Figure 3:
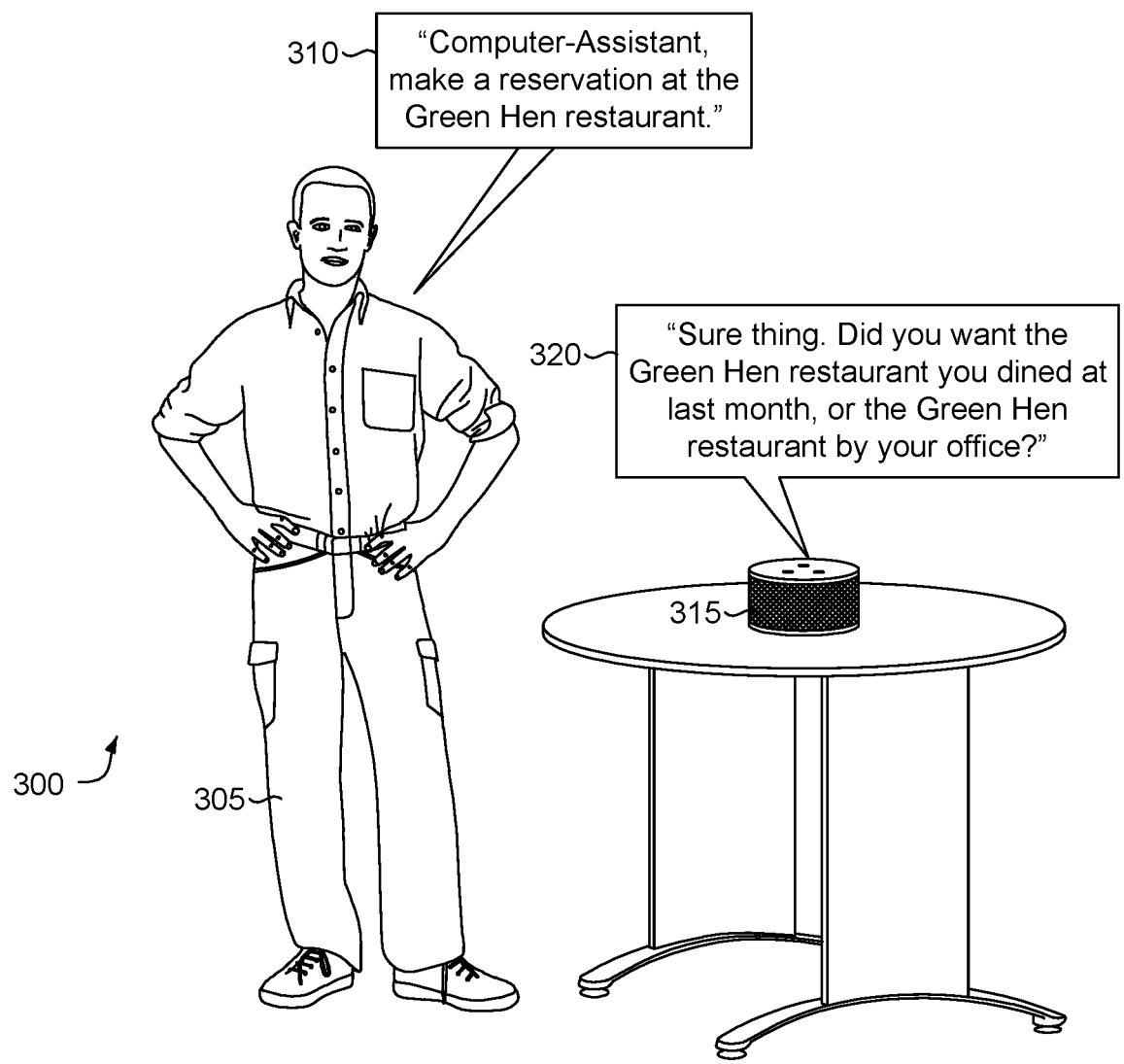
FIG. 3 depicts an example voice-based interaction between a user and a computing system, in accordance with an embodiment of this disclosure.

Turning now to FIG. 3, an example embodiment is illustratively provided depicting a voice-based interaction 300 between a user 305 and a computing system, which is a smart speaker 315. The smart speaker may comprise a user device, such as user device 102a, in FIG. 1. In this example embodiment, smart speaker 315 may utilize system architecture, such as system 200, to determine an intuitive response to the user during the voice-based interaction.

In the example embodiment of FIG. 3, the user 305 speaks a voice-based request 310 to the smart speaker 315. The request 315 comprises a voice command for a computer assistant, such as a virtual assistant operating on smart speaker 315, to "Make a reservation at the Green Hen restaurant." In response to the user request 310, the smart speaker 315 generates and provides a response 320 indicating that the computer assistant will make a reservation, but asking the user 305 a question about which Green Hen restaurant the user desires to make a reservation. Specifically, the smart speaker 315 responds by asking the user 305 if the user 305 wants to make a reservation at the Green Hen restaurant the user dined at last month or the Green Hen restaurant located by the user's work. In this example, following the user request 310, the smart speaker 315 performs a search operation and determines search results that include search-result entities for at least a first and second Green Hen restaurants. Accordingly, the smart speaker 315 (or a virtual assistant or computer program running on it) determines at least one discriminator feature.

In this example, two discriminator features are determined: one comprises a location feature (which is a global feature) because the location of the first and second Green Hen restaurants is different, and the second discriminator comprises a personal feature—that the user has previously visited (dined) at one of the Green Hen restaurants. The example response 320 is generated and includes an indication of the two discriminators (the location feature and the personal feature), that enables the user 305 to distinguish between the two Green Hen restaurants. Further, in this example, the response is personalized to the user by modifying the location to be relative to the user's experience. In particular, instead of providing the address of the second Green Hen restaurant, its location is presented as being near the user's work. It should be understood that although the example embodiment of FIG. 3 is implemented on a smart speaker, some embodiments, as described herein, may be implemented using a user device (such as the user's mobile computing device), a virtual assistant application (or voice-based application) operating on the user device, and a user interface, such as a speaker and microphone on or connected to the user device, or a graphical user interface, such as the device display screen.

Returning now to FIG. 4A, the example of a conventional interaction between a user and smart speaker is depicted, which is described previously. With reference to FIG. 4A, turning now to FIG. 4B, another example embodiment of the technologies described herein is illustratively provided. The example embodiment shown in FIG. 4B contrasts the example conventional interaction depicted in FIG. 4A. In particular, the same user 405 is shown driving a car and interacting with a smart speaker 415. However, in contrast to the outcome in the example of FIG. 4A, in FIG. 4B, the smart speaker 315 generates and provides a more intuitive response 465 to the user request to call Walgreens 451 (scene 450). In particular, in scene 460, the smart speaker 415 responds 465 by asking the user 405 if the user wants to call the Walgreens by the user's home or the one that is 3 blocks away on Main Street. In scene 470, the user 405 replies 452 indicating that the user wants to call the Walgreens on Main Street.

In this example, following the user request 451, the smart speaker 415 causes a search operation to be performed and receives search-result entities for at least a first and second Walgreens pharmacies. The smart speaker 415 (or a virtual assistant or computer program running on it) then determines at least one discriminator feature for these entities. Here, a location feature is determined as a discriminator, because the location of the first and second Walgreens pharmacies is different. A response is generated that includes an indication of this discriminator—the location feature, which will enable the user to differentiate between the two Walgreens pharmacies. Moreover, in this example, the response is personalized to the user by providing a location that is relative to information about the user (i.e., user data indicating the user's current location.) Specifically, the Walgreens pharmacy that is "3 blocks away" from the user.

FIG. 4B also shows the user's reply (scene 470) to the generated response provided to the user. Here, the user's reply comprises an indication of the second entity (i.e., the Walgreens on Main Street). Accordingly, in response to the user's reply, the smart speaker 415 (or a virtual assistant or computer program running on it) may be performing an action associated the second entity (i.e., the Walgreens on Main Street) such as initiating a phone call to that particular Walgreens. Although the example embodiment of FIG. 4B is implemented on a smart speaker, it is contemplated that this embodiment, and any of the smart speaker embodiments described herein, may be implemented using a virtual assistant running on a user device (such as a user's mobile computing device, or other user device 102a, as described in FIG. 1).

Figure 5:
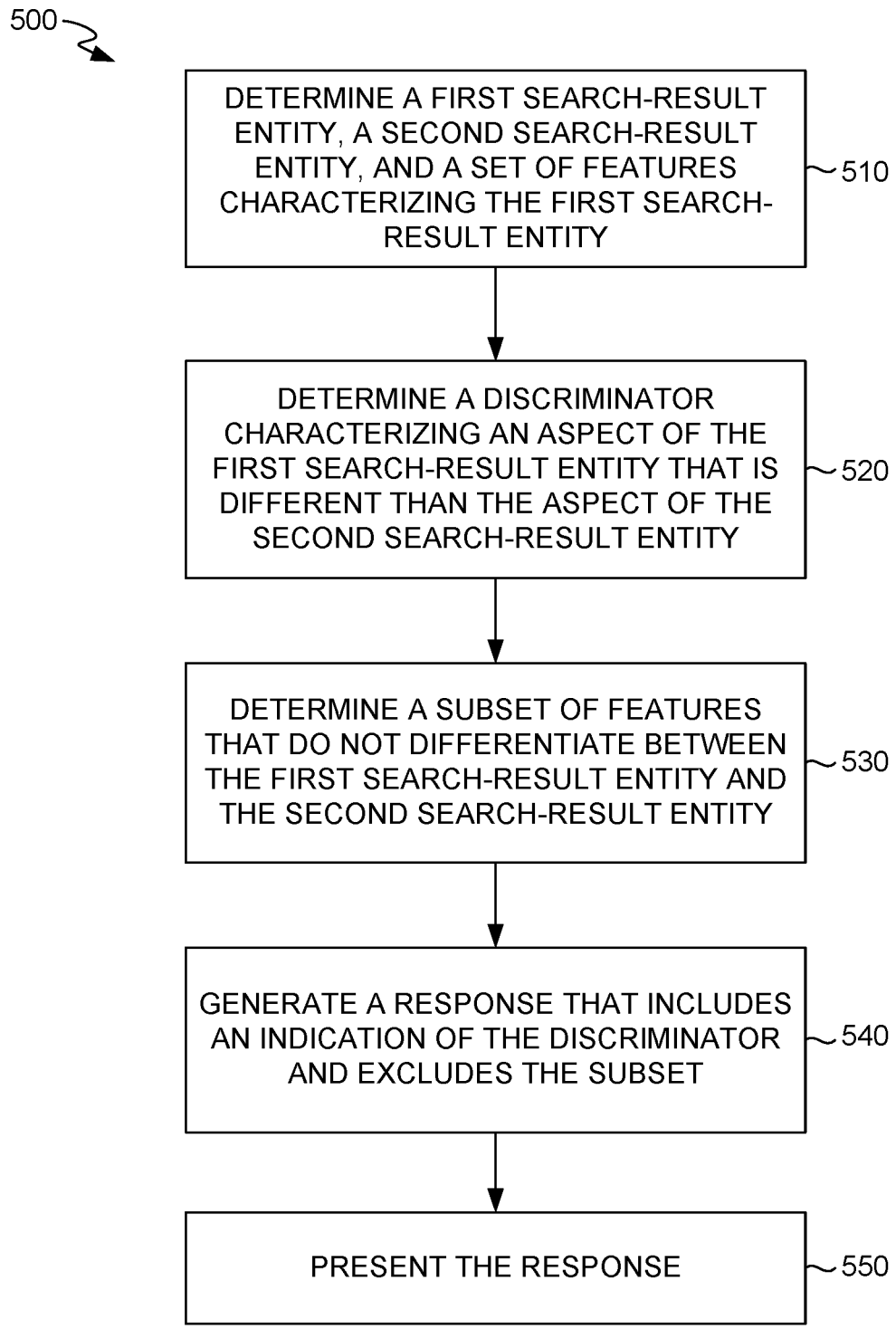
FIGS. 5 and 6 each depict an example process flow for facilitating an improved voice-based interaction between a user and a computing system, in accordance with an embodiment of the disclosure.
Figure 6:
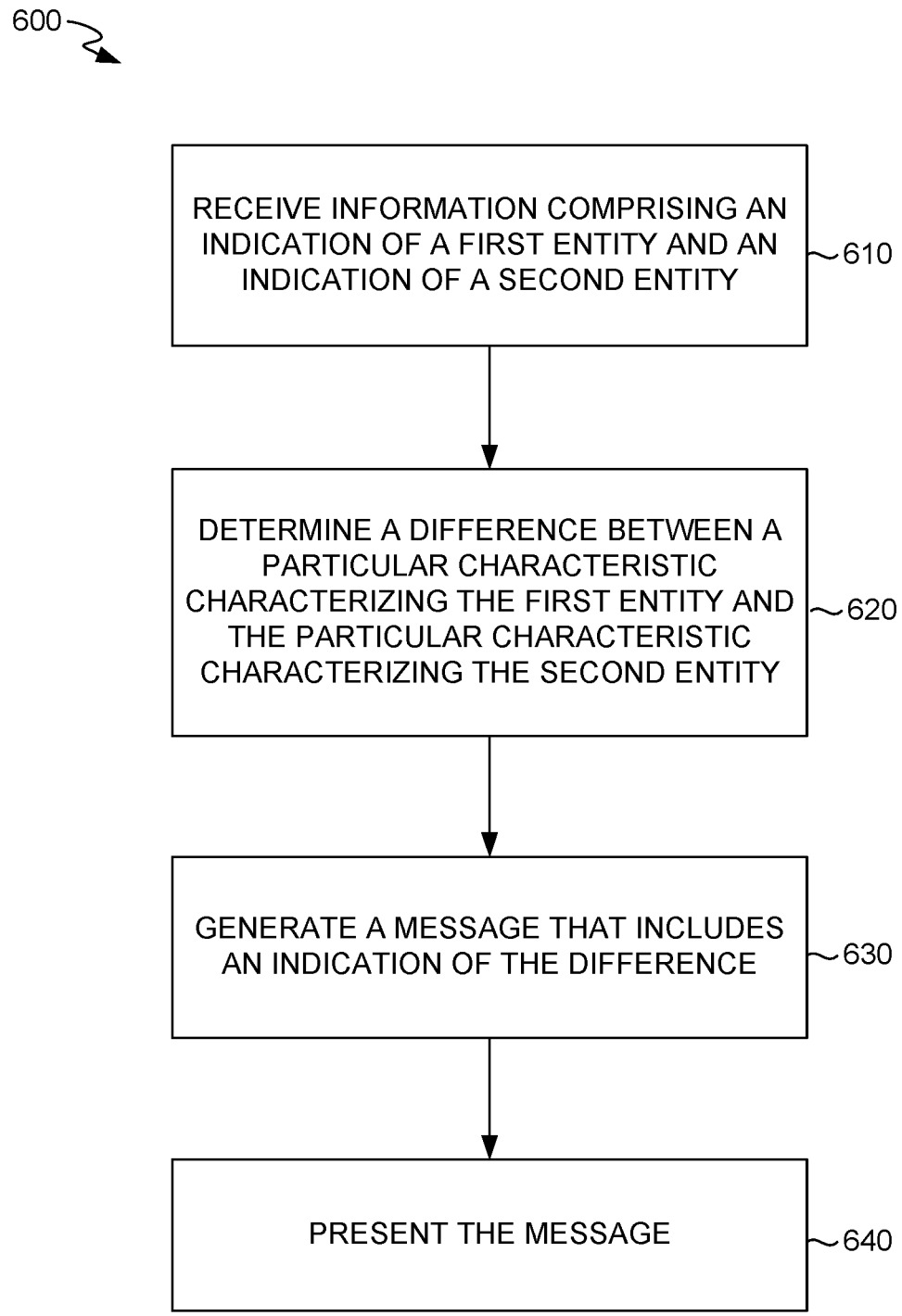

Turning now to FIGS. 5 and 6, aspects of an example process flows 500 and 600 are illustratively depicted for embodiments of the disclosure. Process flows 500 and 600 each may comprise a method (sometimes referred to herein as method 500 and method 600) that may be carried out to implement many of the example embodiments described herein. For instance, process flow 500 or process flow 600 may be utilized to facilitate a voice-based interaction or improve a voice-based interaction between a user and a computing system, such as to perform calling disambiguation in response to a voice command to make a phone call.

An overview of process flow 500 and process flow 600 is depicted in FIGS. 5 and 6, respectively, and the blocks of process flow 500 and 600 that correspond to actions (or steps) to be performed (as opposed to information to be acted on) may be carried out by one or more computer applications or services, in some embodiments, including a virtual assistant, that operate on one or more user devices (such as user device 104a), servers (such as server 106), may be distributed across multiple user devices and/or servers, or may be implemented in the cloud. In one embodiment, the functions performed by the blocks or steps of process flows 500 and 600 are carried out by components of system 200, described in connection to FIG. 2.

With reference to FIG. 5, an overview of process flow 500 is illustratively provided. At block 510, a first search-result entity, a second search-result entity, and a set of features characterizing the first search-result entity are determined. Embodiments of block 510 determine a first and second search-result entities from search results information. For example, search results information can be received from a search-engine performing a searching operation, which may be initiated in response to a user request, such as a voice command. In some embodiments, the search results information may be received from a search-engine(s) interface, such as search-engine(s) interface 250, described in connection to FIG. 2. In some embodiments the first and second search-result entities may be determined using an entity determiner 282, and the set of features characterizing the first search-result entity may be determined utilizing entity feature determiner 284, each described further in connection to FIG. 2. The set of features characterizing the first entity may comprise global features (e.g., entity spelling; physical location or opening hours, if the entity is a venue; colors, size, or other properties that describe the first entity) or personal features, such as current or historic user experiences or user data associated with the first search-result entity. Additional details of embodiments for carrying out block 510 are described in connection to FIG. 2, and in particular feature-discriminator determination 280.

At block 520, a discriminator is determined. The discriminator characterizes an aspect of the first search-result entity that is different than the aspect of the second search-result entity. For example, where the first and second search-result entities are businesses with physical venues, then an aspect that characterizes these entities might comprise their physical locations, their business hours, or some other property that characterizes these entities. Thus, a discriminator determined in block 520 might comprise the physical location aspect, if the location of the first search-result entity is different than the location of the second search-result entity, or the business hours, if these are different (e.g., one entity closes at 10 p.m. and the other entity is open 24 hours). Similarly, the discriminator might be based on a user's personal experience with one of the entities (e.g., a personal feature, such as a previous visit by the user or a communication with the user and the entity). In some embodiments the determined discriminator may include a corresponding score or weighting indicating a degree of difference between the aspect of the first entity and the aspect of the second entity. In particular, some embodiments of block 520 may comprise performing a feature-similarity comparison among the aspects. For instance, features for identical or similar feature types may be compared, and degree of similarity determined, such as described in connection to feature-similarity determiner 286 of FIG. 2.

In some embodiments, the discriminator determined in block 520 may comprise one or more of the features from the set of features in block 510, or may be determined based on one or more of these features. Embodiments of block 520 may determine at least one discriminator, and in some embodiments may determine a plurality of discriminators. Further, in some embodiments the plurality of disseminators may be ranked based on their discriminator score or weighting. Some embodiments of block 520 may be performed by feature discriminator determination 280 or, more specifically, by discriminator determiner 288, of FIG. 2. Some embodiments of block 520 may employ discriminator-determining logic, such as logic 235 described in FIG. 2, and may utilize a feature-discriminator model 248 (FIG. 2) to determine a discriminator. Additional details for determining a discriminator and for embodiments of block 520 are provided in connection to feature discriminator determination 280, in FIG. 2.

At block 530, a subset of features are determined that do not differentiate between the first search-result entity and the second search-result entity. Embodiments of block 530 may determine a subset of features from the set of features characterizing the first search-result entity determined in block 510. The subset of features may comprise one or more aspects or characteristics of the first and second entities that are the same or similar. For example, if the first and second search-result entities are venues, and both entities have the same business hours, then this aspect of the entities is similar, and thus a business hours feature may be included in the subset determined in block 530, in an example embodiment. In particular, because the business hours for both entities (i.e., for both venues) is similar, then it may not be helpful to provide this detail to a user because it does not enable the user to differentiate between the first and second entities. (For instance, a response generated by the computing system, such as "Do you want the entity that is open 24 hours or the entity that is open 24 hours?" would not enable the user to differentiate between these entities.) Accordingly, a subset of features that do enable a user to differentiate, such as the business hours feature in the previous example, may be determined in some embodiments of block 530, so that these features may be excluded in a response generated by the computing system and provided to a user.

Some embodiments of block 530 may employ a feature-similarity function to determine similar or identical features. For instance, a feature similarity operation may be performed by feature similarity determiner 286, in FIG. 2. Additional details for performing feature similarity determination are described in connection to this subcomponent in FIG. 2. Some embodiments of block 530 may be carried out using a feature-discriminator determination 280 component and response generation 290 component of FIG. 2. Additional details of embodiments of block 530 are provided in connection to feature-discriminator determination 280 and response generation 290, in FIG. 2.

At block 540, a response is generated that includes an indication of the discriminator determined in block 520. Some embodiments of block 540 may generate a response that includes the discriminator and further excludes the subset determined in block 530. In this way, the generated response may exclude extraneous details that do not enable a user to differentiate between search-result entities or that otherwise impede a user from continuing the voice-based interactivity session with the computing system. Further still, some embodiments of block 540 comprise generating a response that also includes an indication of at least the first search-result entity determined in block 510.

In some embodiments, the generated response may be personalized to the user. As described in connection to response personalization 294 (FIG. 2), aspects of a response may be modified or supplemental information determined and added that cause a response to be personalized. For example, aspects of a discriminator, such as the address of a location discriminator, may be modified by providing a location relative to the user or to another location that has meaning to the user, such as the user's home, work, or a landmark. Some embodiments of block 540 may utilize a response personalization model, such as model 249 (described in FIG. 2) to facilitate personalizing a response to the user.

In some embodiments the generated response may comprise a text corpus or code that may be utilized for assembling a voice-based response, such as computer-generated (or computer-synthesized) speech. The response may be generated by a computing system, or via a virtual-assistant program operating on the computer system, and may be generated in response to a user request, such as a voice command. Some embodiments of block 540 may be carried out by a response generation 290 component of FIG. 2. Additional details of embodiments of block 540 are provided in connection to response generation 290, in FIG. 2.

At block 550, the response generated in block 540 is presented. Embodiments of block 550 may comprise providing the generated response to a user. For example, as described herein, the response may be provided via a presentation component, such as an acoustic speaker. In some embodiments, a text-to-speech service or computer program may be utilized to convert a response that is a text corpus into a spoken response provided to a user. Some embodiments of block 550 may be carried out by a response generation 290 component or presentation component 220 of FIG. 2. Additional details of embodiments of block 550 are provided in connection to response generation 290 and presentation component 220, in FIG. 2.

Some embodiments of process flow 500 (or method 500) further comprise receiving user feedback from a generated response that is provided to the user. In particular, as described in connection to user feedback 299 of FIG. 2, user feedback may be received and utilized, for example, to re-rank an existing list of discriminators, to determine a new discriminator, or to initiate a new searching operation, via search-engine(s) interface 250. A subsequent response then may be generated and provided to the user. In some embodiments, the user feedback may be utilized to update a feature discriminator model 248 or a response personalization model 249, described in connection to FIG. 2.

Turning now to FIG. 6, a flow diagram is provided illustrating an overview of an example process flow 600. At block 610, information is received comprising an indication of a first entity and an indication of a second entity. The first and second entities may correspond respectively to a first and second search-result entity, or a first and second search results from a searching operation. Embodiments of block 610 may receive the information from search results, which may be received from a search-engine(s) interface, such as search-engine(s) interface 250, described in FIG. 2. For example, as further described in connection to FIG. 2, search results information may comprise a plurality of search result entities and metadata or descriptive information about the entities. The information may be received by a computing system, and more specifically by a domain features determination 260 component or a feature-discriminator determination 280 component, as described in FIG. 2. Some embodiments of block 610 may be carried out by a feature-discriminator determination 280 component of FIG. 2, and additional details of embodiments of block 610 are provided in connection to feature-discriminator determination 280, in FIG. 2.

At block 620, a difference is determined between a particular characteristic characterizing the first entity and the particular characteristic characterizing the second entity. By way of example, as described in block 520, where the first and second entities are businesses with physical venues, a particular characteristic characterizing the entities might comprise their physical locations, their business hours, or some other property that describes an aspect of these entities. Accordingly in this example, block 620 can determine a difference in these characteristics, such as determining that the locations are different or the business hours are different. Similarly, block 620 may determine that a particular characteristic of user experience is different; for instance, the user has a history of interaction with one of the entities, such as a previous visit to the entity.

In some embodiments, block 620 may further determine a degree of the difference, which may comprise a score or weighting, and which may be used to rank the particular characteristic from differences determined for other characteristics characterizing the entities, so that a characteristic having the highest (or higher) score or weighting may be included in a response message generated and provided to the user (or an indication of that characteristic may be included in the response message). In some embodiments of block 620, a plurality of differences corresponding to a plurality of characteristics for the first and second entities may be determined, and may be ranked according to their weighting or scores.

Some embodiments of block 620 may be implemented as an embodiment of block 520 (process flow 500). Some embodiments of block 620 may be performed by feature discriminator determination 280 or, more specifically, by discriminator determiner 288, of FIG. 2. Some embodiments of block 620 may employ discriminator-determining logic, such as logic 235 described in FIG. 2, and may utilize a feature-discriminator model 248 (FIG. 2). Additional details for embodiments of block 620 are provided in connection to feature discriminator determination 280, in FIG. 2.

At block 630, a message is generated that includes an indication of the difference determined in block 620. Embodiments of block 630 may generate a message that is to be provided to a user. In some embodiments the message may comprise a response to respond to a request by the user, such as a voice command. Some embodiments of block 630 may generate a response that includes an indication of at least the first entity from block 610.

In some embodiments, the generated response may be personalized to the user, and may utilize a response personalization model, such as model 249 (described in FIG. 2) to facilitate personalizing a response to the user. For example, as described in connection to response personalization 294 (FIG. 2), aspects of a response may be modified or supplemental information determined and added that cause a response to be personalized. In some embodiments, the generated response may comprise a text corpus or code that may be utilized for assembling a voice-based response, such as computer-generated (or computer-synthesized) speech. Some embodiments of block 630 may be carried out by a response generation 290 component of FIG. 2. Additional details of embodiments of block 630 are provided in connection to response generation 290, in FIG. 2.

At block 640, the message generated in block 630 is presented. Embodiments of block 640 may comprise providing the generated response to a user. For example, as described herein, the response may be provided via a presentation component, such as an acoustic speaker and a text-to-speech service or computer program, which may be utilized to convert a response that is a text corpus into a spoken response provided to a user. Some embodiments of block 640 may be carried out by a response generation 290 component or presentation component 220 of FIG. 2. Additional details of embodiments of block 640 are provided in connection to response generation 290 and presentation component 220, in FIG. 2.

Some embodiments of process flow 600 (or method 600) further comprise receiving user feedback from a generated response that is provided to the user. These embodiments may be implemented as described in process flow 500, and may be performed by a user feedback 299 component, such as described in FIG. 2.

Several additional and non-limiting examples of voice-interactions that are enabled by embodiments of the technologies described herein are now described. In some instances, these examples may be implemented using an embodiment of the example architecture of system 200 or process flows 500 and 600. Each of these examples comprises a voice-interaction between a virtual assistant (e.g., Cortana) operating on a computing system, such as user device 102a, and a user. A user makes a request or voice command, and the virtual assistant responds with a response that includes an indication of at least one discriminator feature enabling the user to differentiate between two or more entities associated with an action to be performed based on the user's request.

Example 1, Making a Reservation

User request: "Hey Cortana, please make a dinner reservation for 4 people at 7 p.m."
Cortana: "OK, at 7 p.m. tonight I can make a reservation at an Italian restaurant or a steak restaurant. Which one would you prefer?"
In this example, the discriminator comprises the restaurant cuisine.

Example 2, Shopping

User request: "Cortana, please order me a replacement charger."
Cortana: "Sure thing, did you want a USB-C charger for your phone?"
User: "Yes."
In this example, the discriminator feature comprises information about the type of charger (e.g., USB-C charger for a phone), which enables the user to differentiate this entity (i.e., this item to purchase) from other chargers that may have been included in search results from a search operation performed on the user's request to order a "replacement charger." For example, another charger might be the car, Dodge Charger.

Example 3, Shopping

User request: "Cortana, please order me a replacement charger."
Cortana: "Sure thing, I see that you currently have a Samsung Galaxy S9, which uses a USB-C cable. I will order a replacement USB-C cable for you. Is that all?"

User: "Yes."
This example is similar to example 2.

Example 4, Shopping

User request: "Cortana, please order me a replacement phone charger."
Cortana: "OK, I see that you purchased a phone charger last March. Do you want me to order that one again, or do you want a different one?"
In this example, the discriminator comprises a personal feature—the user's previous purchase of a phone charger.

Example 5, Shopping

User request: "Hey Cortana, it's cold outside. Please order me a scarf."
Cortana: "OK, I can order you a scarf that is red, blue, or green. Which color scarf do you want?"
In this example, the discriminator comprises a color feature.

Example 6, Shopping

User request: "Hey Cortana, please order me some black socks."
Cortana: "OK, do you want the package of 3 socks for $9 with a rating of 4.7 stars or the package of 4 socks for $12 with a rating of 4.1 stars?"
In this example, the discriminators comprise price, quantity, and customer-rating.

Example 7, Shopping

User request: "Cortana, order a box of cookies and have them delivered to me."
Cortana: "Hmm, OK. Do you want the healthy cookies?"
User: "No."
In this example, the discriminator comprises a description of the entity (i.e., the cookies that are "healthy").

Example 8, Opening a File

User request: "Cortana, open the last email I sent to Bob."
Cortana: "OK, did you mean Bob your coworker or Bob the plumber?"
This example comprises two discriminators. The first discriminator is a personal feature (i.e., the first Bob is a coworker). The second discriminator may be determined from metadata in search results returned from a search operation performed in response to the user's request, or may be determined as supplemental information from an additional search operation on other features or search results information about the second Bob.

Example 9, Opening a File

User request: "Open the code I was working on last week."
Cortana: "OK, do you want the program file that you worked on Monday with Dikla or the program file that you worked on Thursday with Haim?"
This example comprises two discriminators that are both personal features. The first discriminator is the day last week when the user worked on the code. The second discriminator is an indication of another person who worked on the code also, and which may be determined from metadata associated with the program file (e.g., file access or editing) or by communications such as emails between the user and the other person about the particular program file.

Example 10, Calling a Venue

User request: "Smart Speaker, call Pizza Hut."
Cortana: "Do you want to call the Pizza Hut you visited before in Redmond or the Pizza Hut in Bellevue?"
User: "Neither, I want to call a different Pizza Hut."
Cortana: "OK, I see a Pizza Hut near your home, one near your gym, and one near your office. Which one did you want to call?"
In this example, the discriminators comprise a location feature and a personal feature (user history of a previous visit.) In the follow-up response, the discriminator is a location feature that is a personal feature, because the location is provided in relation to locations of significance to the user (i.e., the user's work, gym, and home).

Accordingly, we have described various aspects of technology directed to systems and methods for improved voice-based user-computer interaction technology and improving the user experience for computer-performed searching within voice-based applications and computing devices. It is understood that various features, sub-combinations, and modifications of the embodiments described herein are of utility and may be employed in other embodiments without reference to other features or sub-combinations. Moreover, the order and sequences of steps (or blocks) shown in the example methods 500 and 600 are not meant to limit the scope of the technologies described herein in any way, and in fact, the steps or blocks may occur in a variety of different sequences within embodiments hereof. Such variations and combinations thereof are also contemplated to be within the scope of embodiments of the disclosure.

Figure 7:
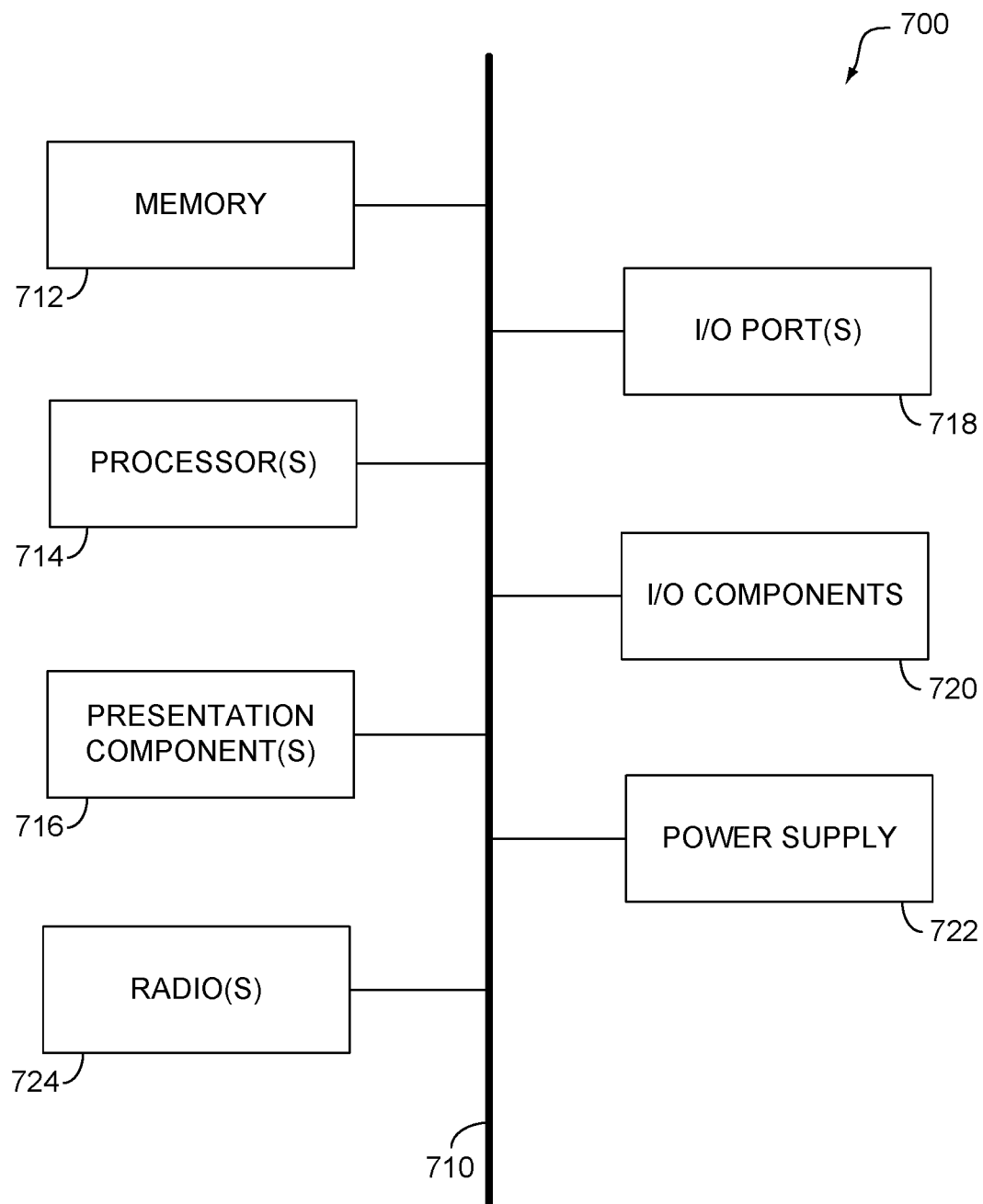
FIG. 7 is a block diagram of an exemplary computing environment suitable for use in implementing an embodiment of the disclosure.

Having described various embodiments of the disclosure, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized method to improve a voice-based interaction between a user and a computing system, comprising:

receiving search results information comprising at least a first search result and a second search result;

determining a first search-result entity from the first search result;

determining a second search-result entity from the second search result;

determining, from the search results information, a first set of features characterizing the first search-result entity;

based on the first set of features, determining a discriminator characterizing an aspect of the first search-result entity that differentiates the first search-result entity from the second search-result entity;

determining a subset of features, from the first set of features, that do not differentiate between the first search-result entity and the second search-result entity;

generating a response, comprising a request for the user to choose the first search-result entity or the second search-result entity based on an indication of the discriminator, and excluding the subset of features that do not differentiate between the first search-result entity and the second search-result entity; and causing presentation of the response.

2. The computerized method of claim 1, wherein the search results information is received from a search operation performed in response to a user request.

3. The computerized method of claim 1, further comprising:

determining from the search results information, a second set of features characterizing the second search-result entity; and wherein determining the discriminator comprises performing a similarity comparison between a first feature from the first set of features and a second feature from the second set of features.

4. The computerized method of claim 1, wherein the discriminator comprises a personal feature or a global feature.

5. The computerized method of claim 1, wherein the discriminator comprises a personal feature that is determined by performing a searching operation on current or historical user data for the user.

6. The computerized method of claim 1, wherein the search results information includes an indication of a search domain, and wherein the first set of features characterizing the first search-result entity are determined based on the search domain.

7. The computerized method of claim 1, wherein the response further includes the second search-result entity.

8. The computerized method of claim 7, wherein the indication of the discriminator comprises information that indicates the aspect of the first search-result entity that is different than the aspect of the second search-result entity.

9. The computerized method of claim 1, further comprising modifying the discriminator to be personalized to the user, thereby creating a personalized discriminator, and including, in the response, an indication of the personalized discriminator.

10. The computerized method of claim 1, further comprising:

receiving user feedback;

based on the user feedback and the search results information, determining a second discriminator characterizing a second aspect of the first search-result entity that differentiates the first search-result entity from the second search-result entity; and generating and providing a second response, the second response including at least an indication of the second discriminator.

11. The computerized method of claim 1, further comprising receiving user feedback; and wherein determining the discriminator comprises utilizing an adaptive model that is updated based on the user feedback.

12. The computerized method of claim 1, further comprising receiving from the user an answer to the response, the answer indicating the first search-result entity or the second search-result entity.

13. A computing device for conducting voice-based interaction between a user and the computing device, comprising:

an acoustic speaker;

one or more processors; and computer storage memory having computer-executable instructions stored thereon which, when executed by the one or more processors, implement a method comprising:

receiving search results information including at least a first search result and a second search result;

determining a first search-result entity from the first search result;

determining a second search-result entity from the second search result;

determining one or more aspects of the first search-result entity;

determining a discriminator, the discriminator characterizing a first aspect of the first search-result entity that is different than the first aspect of the second search-result entity;

generating a message comprising at least an indication of the discriminator and a request for the user to confirm the first search-result entity or the second search-result entity based on the discriminator; and providing the message by way of the acoustic speaker.

14. The computing device of claim 13, wherein the message further comprises the first search-result entity.

15. The computing device of claim 13, further comprising a microphone, and the method further comprising:

receiving, using the microphone, a spoken user command; and in response to the spoken user command, performing a first searching operation;

wherein the search results information is received from the first searching operation; and wherein the message is a response by the computing device to the spoken user command.

16. The computing device of claim 13, the method further comprising receiving from the user a response to the message, the response indicating the first search-result entity or the second search-result entity, and based on the response, performing an action associated with the first search-result entity or the second search-result entity indicated by the response.

17. The computing device of claim 13, further comprising modifying the discriminator to be personalized to the user, thereby creating a personalized discriminator, and including, in the message, an indication of the personalized discriminator.

18. The computing device of claim 13, wherein the discriminator comprises a personal feature that is determined by performing a searching operation on current or historical user data for the user.

19. Computer-storage media having computer-executable instructions stored thereon, which when executed by one or more processors perform a method to facilitate a voice-based interactive session between a user and a computing system, the method comprising:
- receiving information comprising an indication of a first entity and an indication of a second entity determined from a first search result and a second search result, respectively;
- determining one or more characteristics of the first entity;
- based on the information, determining a difference between a first characteristic characterizing the first entity and the first characteristic characterizing the second entity;
- generating a message that includes an indication of the difference between the first characteristic of the first entity and the first characteristic of the second entity, and a request for the user to confirm the first entity or the second entity based on the difference; and
- causing the message to be presented.

20. The computer-storage media of claim 19, the method further comprising receiving from the user a response to the message, the response indicating the first entity or the second entity, and based on the user response causing to be performed, an action associated with the first entity or the second entity indicated by the user's response.

* * * * *